United States Patent
Gude et al.

(10) Patent No.: US 12,207,293 B2
(45) Date of Patent: Jan. 21, 2025

(54) RANDOM ACCESS CHANNEL PROCEDURES

(71) Applicant: QUALCOMM Incorporated, San Diego, CA (US)

(72) Inventors: Venkata Siva Prasad Rao Gude, San Diego, CA (US); Muhammad Nazmul Islam, Littleton, MA (US); Ambarish Tripathi, San Diego, CA (US); Daniel Alejandro Olmos, San Diego, CA (US); Vinesh Kisan Kaviskar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 17/873,827

(22) Filed: Jul. 26, 2022

(65) Prior Publication Data

US 2024/0040609 A1 Feb. 1, 2024

(51) Int. Cl.
*H04W 74/08* (2024.01)
*H04W 72/04* (2023.01)
*H04W 74/00* (2009.01)
*H04W 74/0833* (2024.01)

(52) U.S. Cl.
CPC ..... *H04W 74/004* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2015/0029921 A1* | 1/2015 | Lu | H04W 76/28 370/311 |
| 2016/0309399 A1* | 10/2016 | Swaminathan | H04W 48/16 |
| 2021/0219163 A1* | 7/2021 | Sha | H04W 76/30 |
| 2021/0378025 A1* | 12/2021 | Lin | H04W 74/0833 |
| 2022/0061106 A1* | 2/2022 | Zhang | H04W 74/006 |
| 2022/0295571 A1* | 9/2022 | Da Silva | H04W 74/0866 |
| 2023/0217506 A1* | 7/2023 | Löhr | H04W 74/006 370/329 |

* cited by examiner

*Primary Examiner* — Sai Aung
(74) *Attorney, Agent, or Firm* — Loza & Loza, LLP

(57) ABSTRACT

Aspects relate to random access channel procedures. In some examples, if a user equipment (UE) has not successfully received a random access channel (RACH) downlink message prior to the end of a random access window for a first RACH attempt, the UE may elect to proceed with a second RACH attempt. For example, the UE may determine whether there are any remaining downlink symbols available during the random access window to receive the RACH downlink message. If not, the UE may retransmit a physical RACH (PRACH) preamble.

30 Claims, 17 Drawing Sheets

RANDOM ACCESS CHANNEL PROCEDURES

TECHNICAL FIELD

The technology discussed below relates generally to wireless communication and, more particularly, to random access channel procedures.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) to be used by different UEs operating within the cell.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a user equipment may include a transceiver, and a processor coupled to the transceiver. The processor may be configured to transmit, via the transceiver, a first random access channel (RACH) uplink message for a first RACH attempt. The processor may also be configured to determine that a RACH downlink message for the first RACH attempt has not been successfully decoded during a random access window and that there are no remaining downlink symbols available during the random access window to receive the RACH downlink message. The processor may further be configured to transmit, via the transceiver, a second RACH uplink message for a second RACH attempt based on the determination that the RACH downlink message for the first RACH attempt has not been successfully decoded during the random access window and that there are no remaining downlink symbols available during the random access window to receive the RACH downlink message.

In some examples, a method for wireless communication at a user equipment is disclosed. The method may include transmitting a first random access channel (RACH) uplink message for a first RACH attempt. The method may also include determining that a RACH downlink message for the first RACH attempt has not been successfully decoded during a random access window and that there are no remaining downlink symbols available during the random access window to receive the RACH downlink message. The method may further include transmitting a second RACH uplink message for a second RACH attempt based on the determining that the RACH downlink message for the first RACH attempt has not been successfully decoded during the random access window and that there are no remaining downlink symbols available during the random access window to receive the RACH downlink message.

In some examples, a user equipment may include means for transmitting a first random access channel (RACH) uplink message for a first RACH attempt. The user equipment may also include means for determining that a RACH downlink message for the first RACH attempt has not been successfully decoded during a random access window and that there are no remaining downlink symbols available during the random access window to receive the RACH downlink message. The user equipment may further include means for transmitting a second RACH uplink message for a second RACH attempt based on the determining that the RACH downlink message for the first RACH attempt has not been successfully decoded during the random access window and that there are no remaining downlink symbols available during the random access window to receive the RACH downlink message.

In some examples, a non-transitory computer-readable medium has stored therein instructions executable by one or more processors of a user equipment device to transmit a first random access channel (RACH) uplink message for a first RACH attempt. The computer-readable medium may also have stored therein instructions executable by one or more processors of the user equipment to determine that a RACH downlink message for the first RACH attempt has not been successfully decoded during a random access window and that there are no remaining downlink symbols available during the random access window to receive the RACH downlink message. The computer-readable medium may further have stored therein instructions executable by one or more processors of the user equipment to transmit a second RACH uplink message for a second RACH attempt based on the determination that the RACH downlink message for the first RACH attempt has not been successfully decoded during the random access window and that there are no remaining downlink symbols available during the random access window to receive the RACH downlink message.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
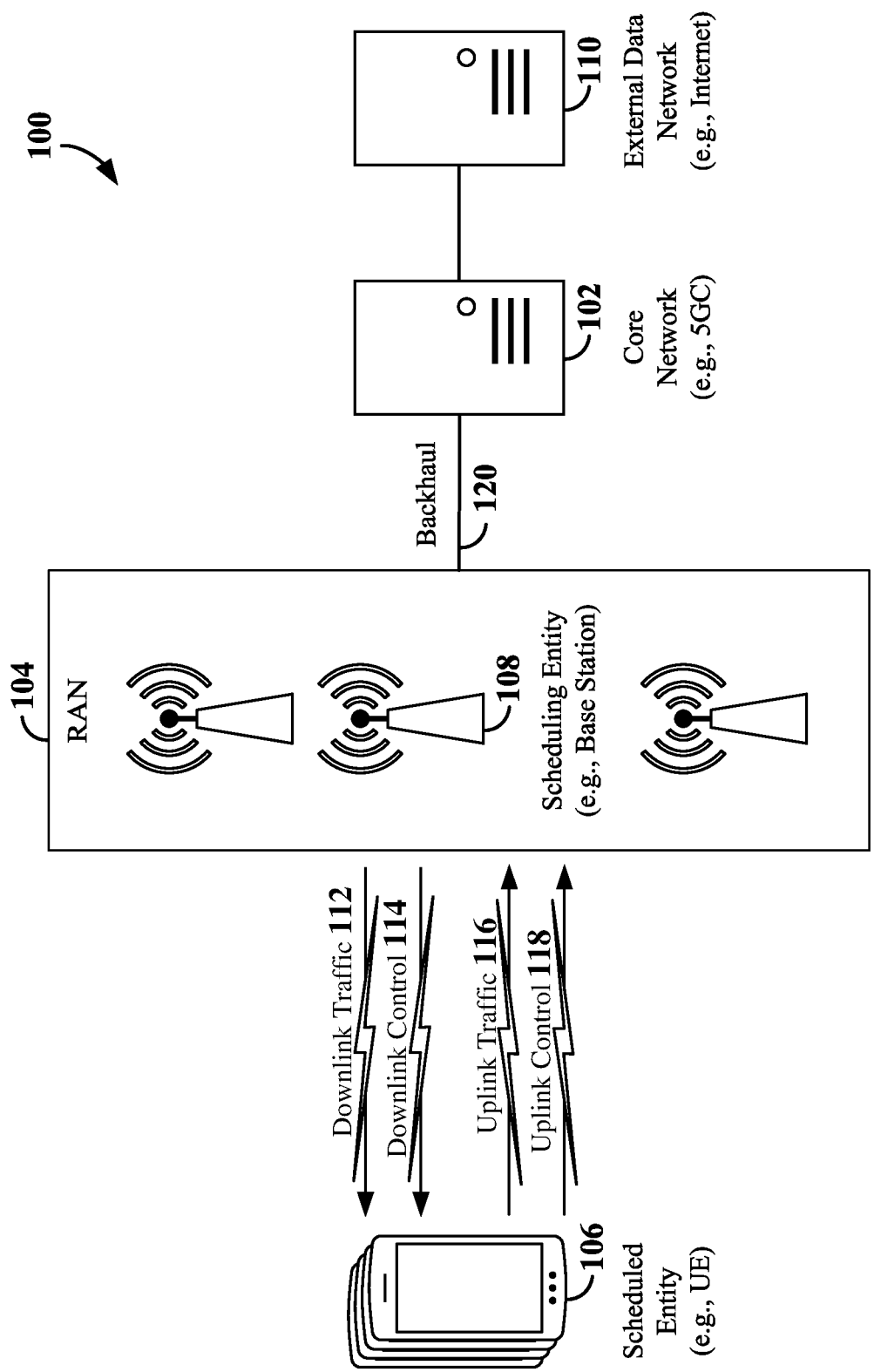
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to random access channel procedures. A network entity such as a base station may configure a user equipment (UE) with certain parameters that the UE uses for random access channel (RACH) procedures. These parameters indicate, for example, RACH occasions and durations of random access windows for the RACH procedures.

In some examples, if a UE has not successfully received a random access channel (RACH) downlink message prior to the end of a random access window for a first RACH attempt, the UE may characterize the first RACH attempt as a RACH failure. The UE may then proceed with a second RACH attempt. For example, the UE may determine whether there are any remaining downlink symbols available during the random access window to receive the RACH downlink message. If not, the UE may retransmit a physical RACH (PRACH) preamble for a second RACH attempt. In some examples, the UE may retransmit the PRACH preamble prior to the end of the random access window for the first PRACH attempt.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multi-point transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
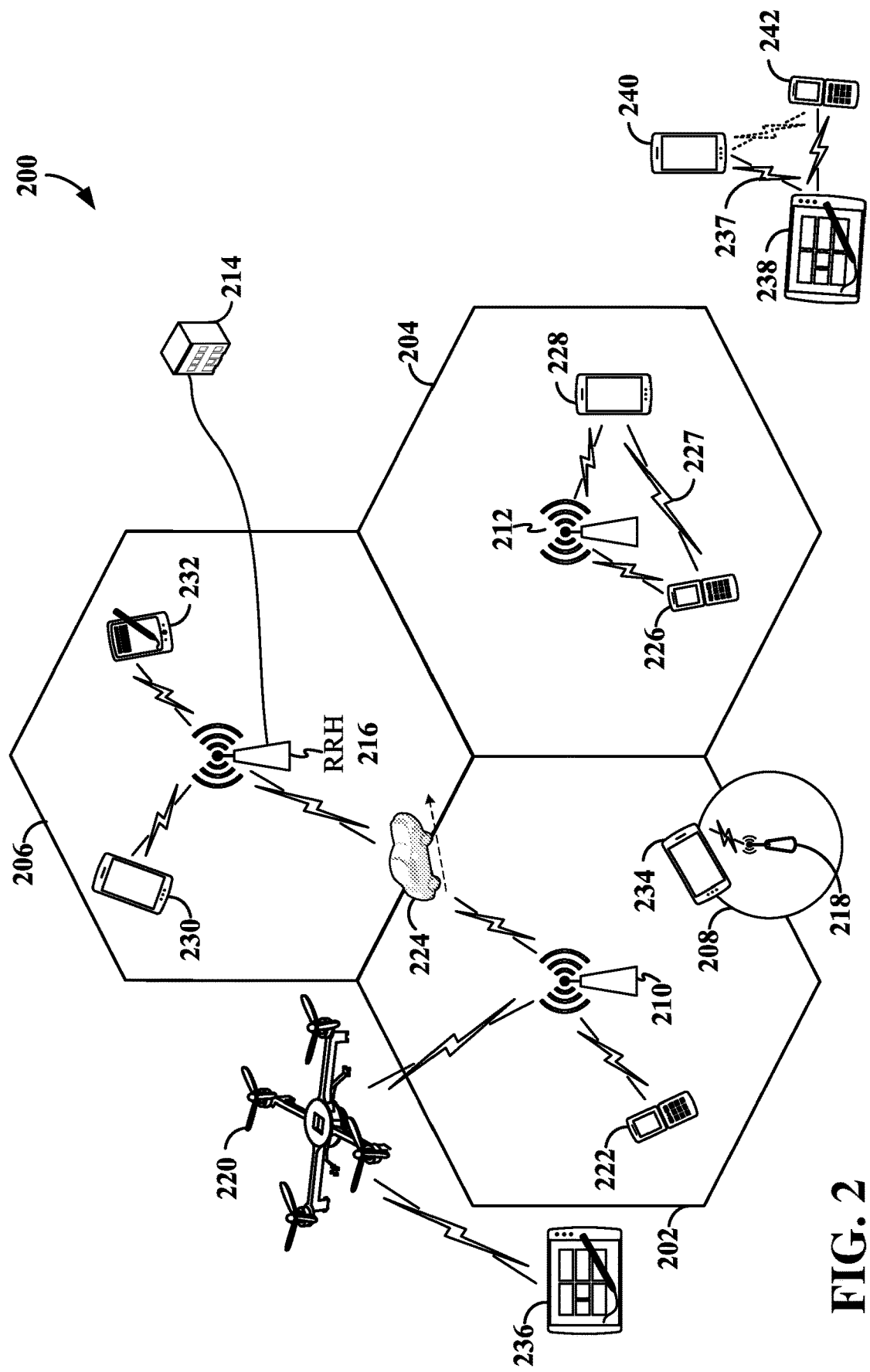
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
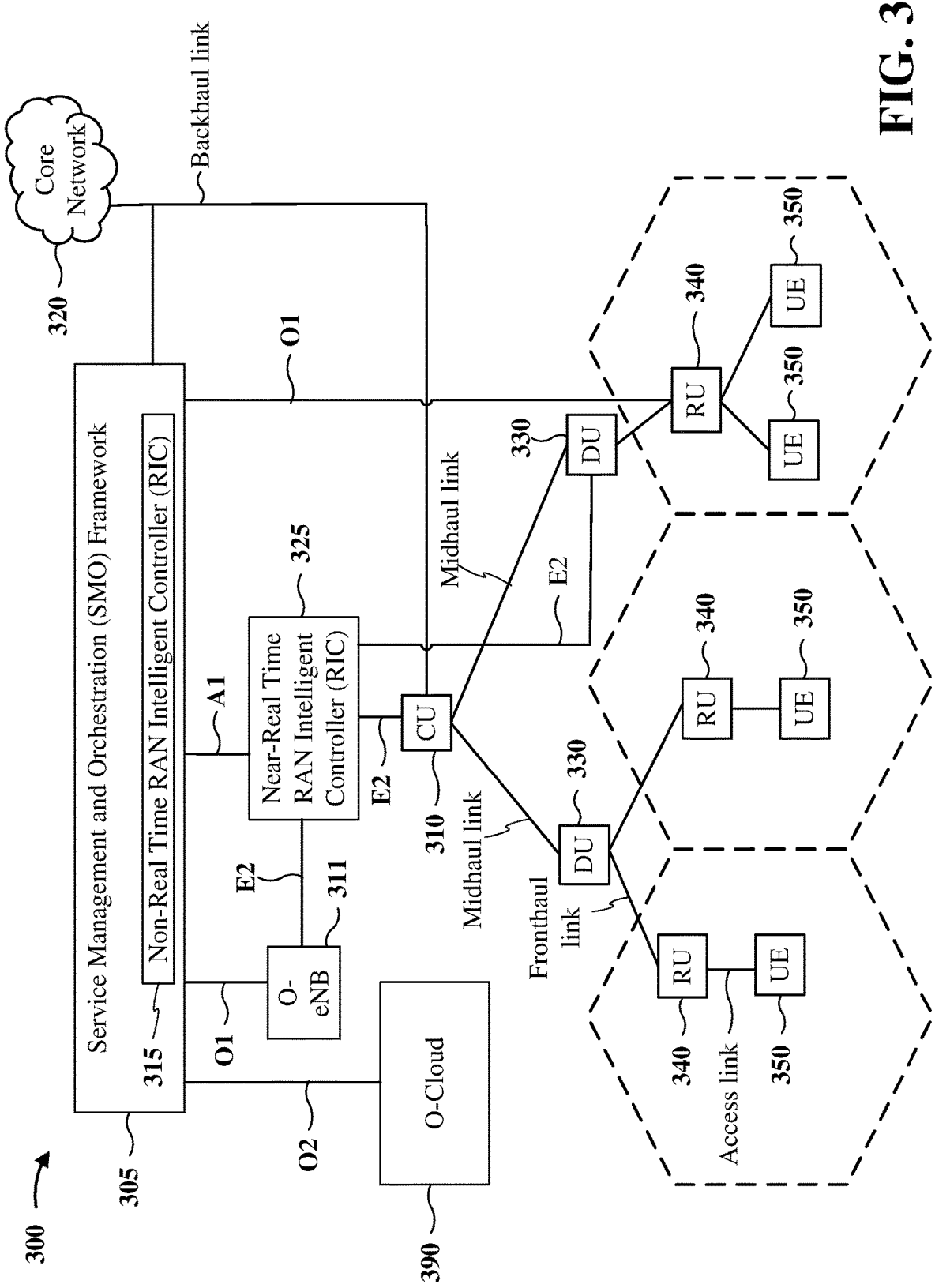
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
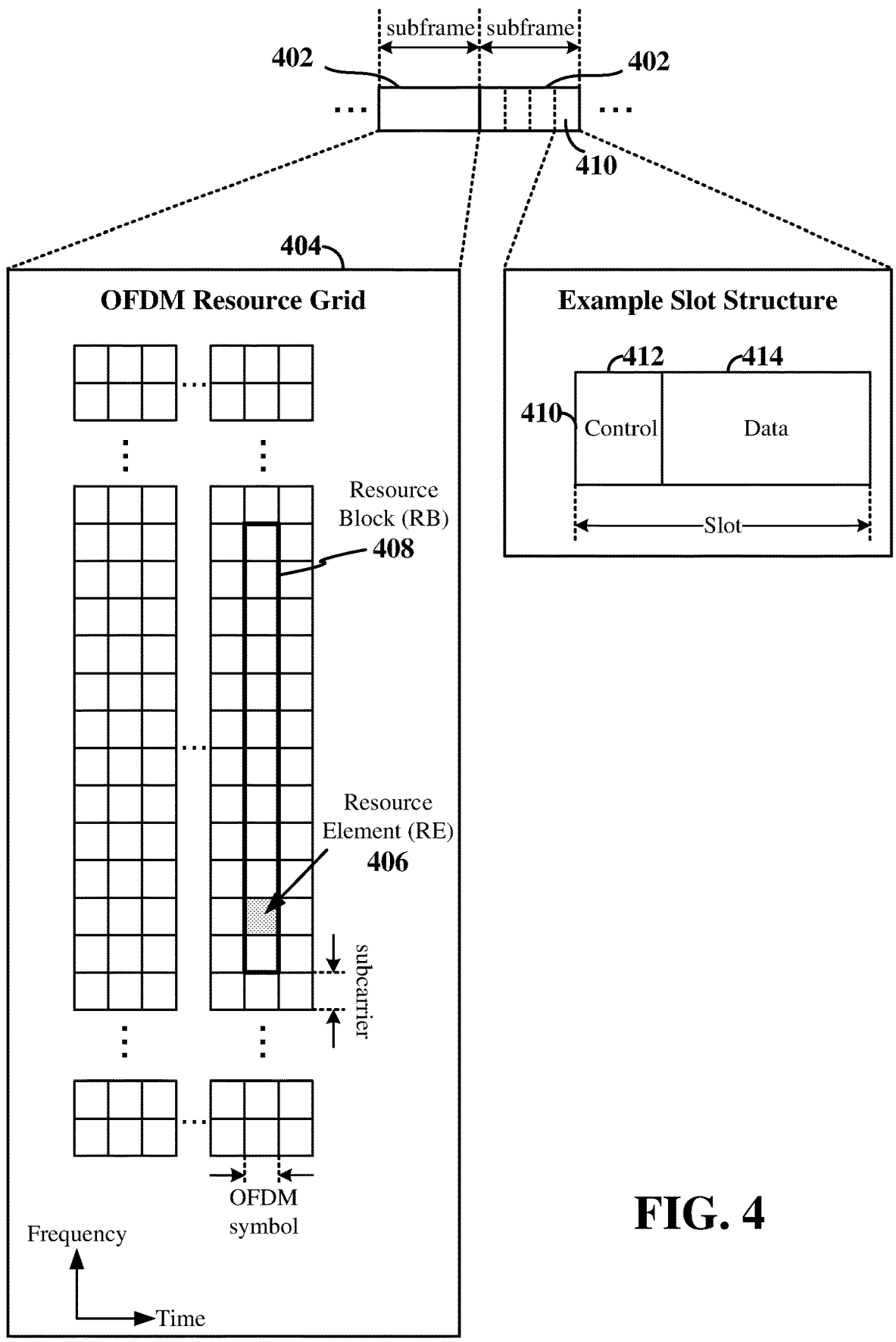
FIG. 4 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time— frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIB s and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5A:
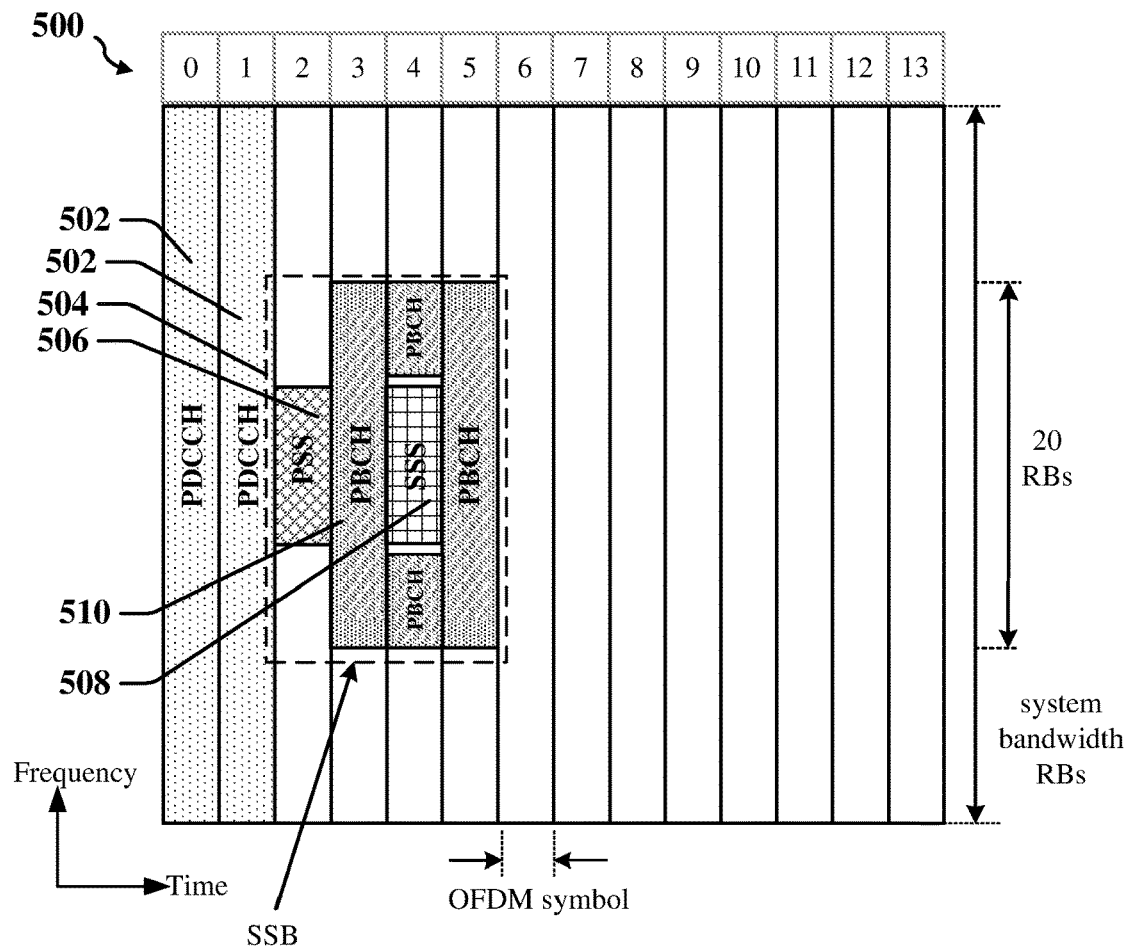
FIG. 5A is a diagram illustrating an example of a frame structure of synchronization signals for use in a wireless communication network according to some aspects.

FIG. 5A illustrates an example 500 of various downlink channels within a subframe of a frame including channels used for initial access and synchronization. As shown in FIG. 5A, a physical downlink control channel (PDCCH) 502 is transmitted in at least two symbols (e.g., symbol 0 and symbol 1) and may carry DCI within at least one control channel element (CCE), with each CCE including nine RE groups (REGs), and each RE group (REG) including four consecutive REs in an OFDM symbol. Additionally, FIG. 5A illustrates an exemplary synchronization signal block (SSB) 504 that may be periodically transmitted by a base station or gNB. The SSB 504 carries synchronization signals PSS 506 and SSS 508 and broadcast channels (PBCH) 510. In this example, the SSB 504 contains one PSS symbol (shown in symbol 2), one SSS symbol (shown in symbol 4) and two PBCH symbols (shown in symbols 3 and 5). The PSS and SSS combination may be used to identify physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DMRS. The physical broadcast channel (PBCH), which carries a master information block (MIB), is logically grouped with the PSS and SSS to form the synchronization signal; i.e., the SSB 504. The MIB provides a number of RBs in the system bandwidth and a system frame number (SFN).

Figure 5B:
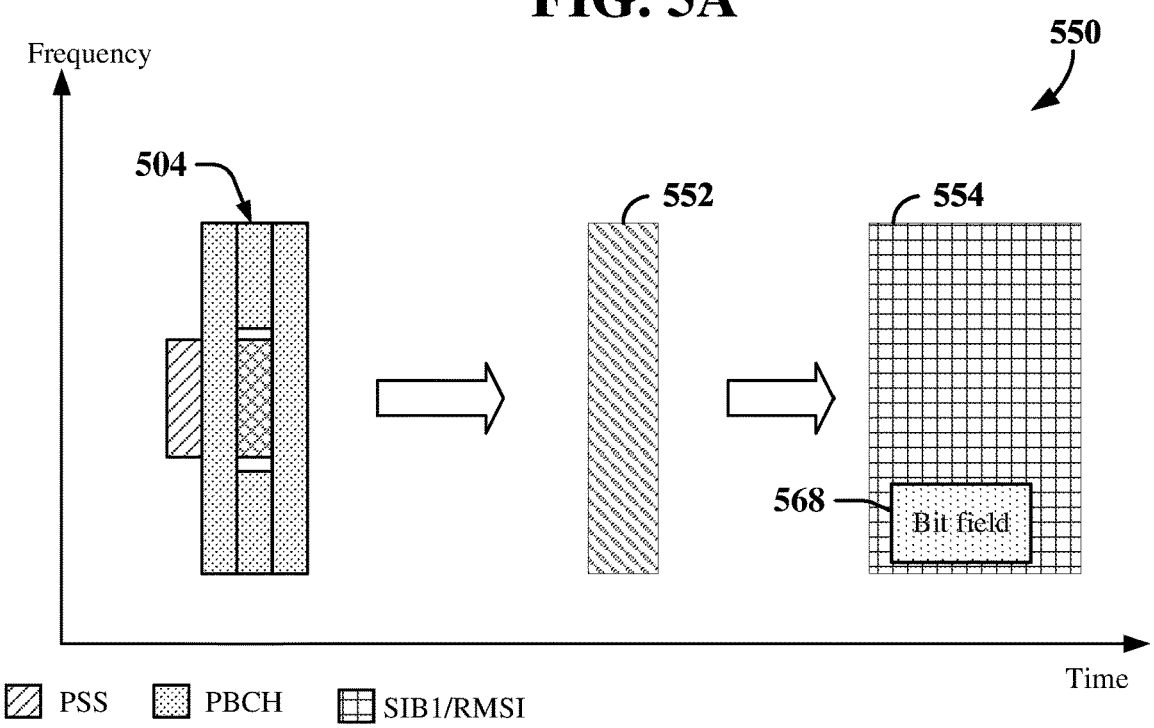
FIG. 5B is a diagram illustrating an example of a portion of a frame or subframe structure with various channels and associated messages for use in a wireless communication network according to some aspects.

FIG. 5B is a diagram illustrating various broadcast information 550 related to initial cell access according to some examples. The broadcast information 550 may be transmitted by a RAN node (e.g., a base station, such as an eNB or gNB) on resources (e.g., time—frequency resources) allocated for the transmission of the broadcast information 550 in a cell. The broadcast information 550 includes the SSB 504 illustrated in FIG. 5A. It is noted that the PBCH in the SSB 504 includes the MIB carrying various system information (SI) including, for example, a cell barred indication, the subcarrier spacing, the system frame number, and scheduling information for a CORESET0 552. For example, the PBCH in the SSB 504 may include scheduling information indicating time-frequency resources allocated for the CORESET0 552. In some examples, the CORESET0 552 may be transmitted within the first four symbols (e.g., within a control region) of a slot. In addition, the CORESET0 552 carries a PDCCH with DCI that contains scheduling information for scheduling the SIB1 554. The SIB1 554 is carried within a physical downlink shared channel (PDSCH) within a data region of a slot. In addition, the SIB1 554 may be referred to as RMSI and includes, for example, a set of radio resource parameters providing network identification and configuration. For example, the set of radio resource parameters may include a bandwidth (e.g., number of BWPs) on which a UE may communicate with a base station.

FIG. 5B also illustrates that the RMSI of the SIB1 message 554 may also include a bit field 568 (e.g., including various parameters). The time/frequency location of this bit field 568 is merely exemplary to show that this bit field 568 utilizes some of the time and frequency resources of the SIB1 message 554.

The MIB in the PBCH may include system information (SI), along with parameters for decoding a SIB (e.g., SIB1). Examples of SI transmitted in the MIB may include, but are not limited to, a subcarrier spacing, a system frame number, a configuration of a PDCCH control resource set (CORESET) (e.g., PDCCH CORESET0), and a search space for SIB1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a base station (BS) may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN (e.g., the RAN 200 of FIG. 2) may perform an initial cell search by detecting a PSS from a BS (e.g., the PSS of a cell of the BS) of the RAN. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIB s discussed above. The system information may include information that a UE can use to access the network such as downlink (DL) channel configuration information, uplink (UL) channel configuration information, access class information, and cell barring information, as well as other information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN. In some examples, the SIB2 includes random access configuration information (e.g., a RACH configuration) that indicates the resources that the UE is to use to communicate with the RAN during initial access. The random access configuration information may indicate, for example, the resources allocated by the RAN for a random access channel (RACH) procedure. For example, the RACH configuration may indicate the resources allocated by the network for the UE to transmit a physical random access channel (PRACH) preamble and to receive a random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 6:
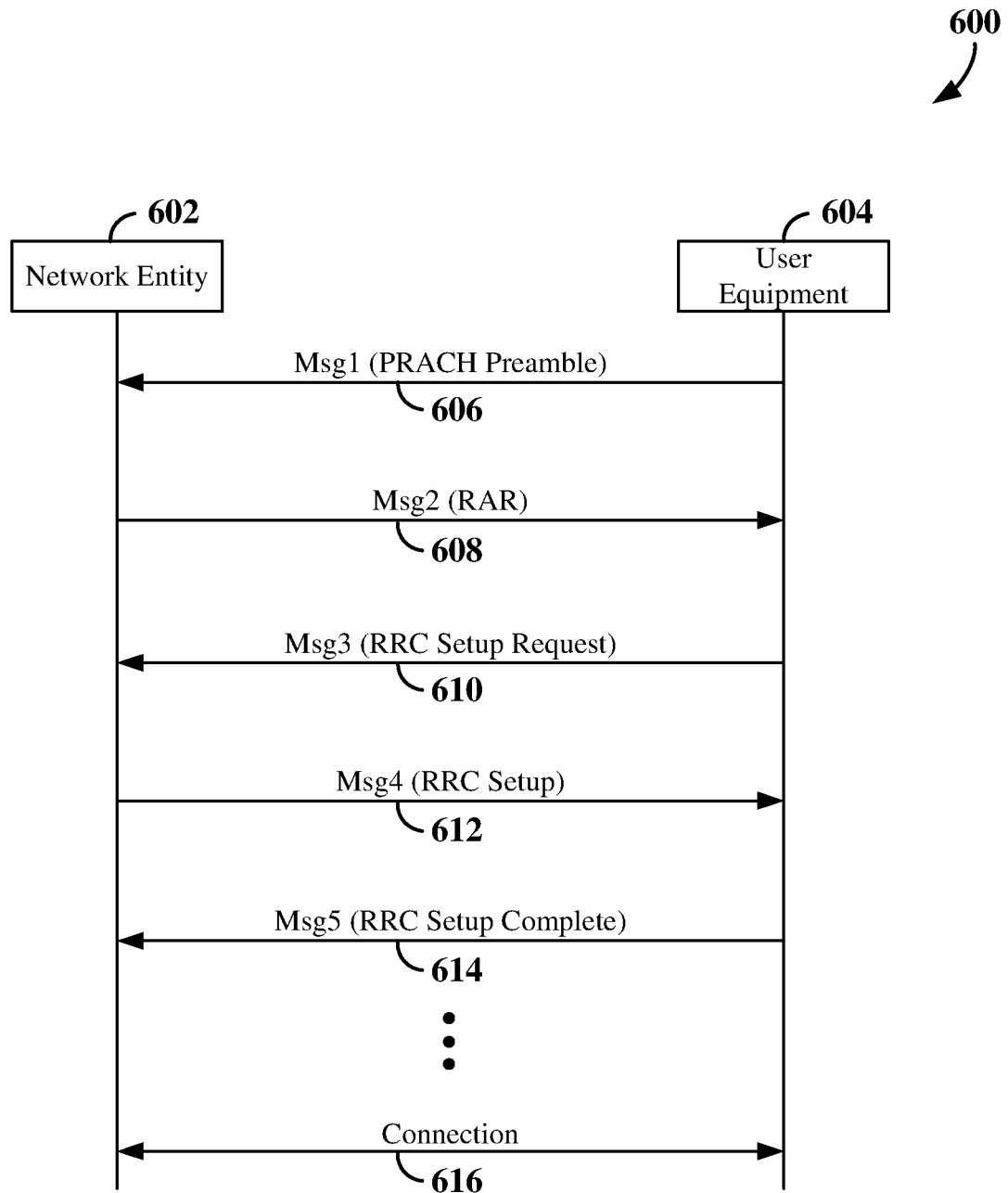
FIG. 6 is a signaling diagram of an example of random access channel (RACH) signaling according to some aspects.

FIG. 6 is a signaling diagram 600 illustrating an example of signaling for a contention-based RACH procedure in a wireless communication system including a network entity (e.g., a base station) 602 and a user equipment 604. In some examples, the network entity 602 may correspond to any of the network entities, base stations, CUs, DUs, RUs, or scheduling entities shown in any of FIGS. 1, 2, 3, 6, 12, 13, and 16. In some examples, the user equipment 604 may correspond to any of the UEs or scheduled entities shown in any of FIGS. 1, 2, 3, 6, 12, 13, and 14.

At #606 of FIG. 6, the user equipment 604 transmits a message 1 (which may be referred to as Msg1 or MSG1) of the RACH procedure to the network entity 602. In some examples, the Msg1 is a PRACH preamble. RACH Msg1 may be referred to as PRACH. As mentioned above, the user equipment 604 may transmit the PRACH preamble on resources specified by a RACH configuration included in SIB2.

At #608, the network entity 602 responds to the PRACH preamble with a message 2 (which may be referred to as Msg2 or MSG2) of the RACH procedure. The Msg2 may be referred to informally as a random access response (RAR). In some examples of #608, the network entity 602 transmits a DCI on a PDCCH, where the DCI schedules a PDSCH (e.g., the DCI specifies the resources for the PDSCH transmission). The network entity 602 then transmits the PDSCH which includes the RAR data such as, for example, an UL grant for the user equipment to transmit a message 3 (which may be referred to as Msg3 or MSG3) of the RACH procedure.

In some examples, the user equipment monitors for the RACH Msg2 on resources specified by the RACH configuration during the RAR window specified by the RACH configuration. For example, the user equipment may decode the DCI carried on the PDCCH and then decode the RAR carried on the PDSCH.

At #610, upon receiving all of the RAR information, the user equipment 604 transmits the Msg3 of the RACH procedure. In some examples, the RACH Msg3 is a radio resource control (RRC) Setup Request message.

At #612, the network entity 602 responds with a message 4 (which may be referred to as Msg4 or MSG4) of the RACH procedure. In some examples, the RACH Msg4 is an RRC Setup message (e.g., a contention resolution message).

At #614, the user equipment 604 responds with a message 5 (which may be referred to as Msg5 or MSG5) of the RACH procedure. In some examples, the RACH Msg5 is an RRC Setup Complete message. In some examples, if the user equipment 604 successfully decodes the RACH Msg 4, the transmission of RACH Msg5 may involve transmitting a PUCCH including a HARQ-ACK for the PDSCH data of RACH Msg4. In some examples, PUCCH frequency hopping may be used for this transmission of the RACH Msg5.

As indicated by #616, the network entity 602 and the user equipment 604 ultimately establish a connection and enter an active operational phase where data may be exchanged. For example, the network entity 602 may schedule the user equipment 604 for UL communication and/or DL communication.

NR supports scalability and deployments that are more efficient and cost-effective. Consequently, a new UE type with reduced capabilities (a RedCap UE) has been defined. A RedCap UE may have one or more of a lower peak throughput requirement, a relaxed latency requirement, or a relaxed reliability requirement. Examples of RedCap UEs include, without limitation, sensors, cameras, IoT devices with relaxed requirements, and smart wearables. In some examples, a RedCap UE may be battery powered. For a RedCap UE, resource allocation may be scalable, coverage enhancements may be provided for the DL and the UL, additional power saving may be provided in all radio resource control (RRC) states, and co-existence with NR premium UEs may be supported.

A RedCap UE's maximum channel (RF) bandwidth can be smaller than the bandwidth of the operating band. A RedCap UE may be configured with a RedCap initial BWP that contains a RACH search space, but does not carry an SSB. During a RACH procedure, a RedCap UE may have to track and measure the SSB from an outside BWP for timing and RACH resource selection. Thus, the RedCap UE may decide to switch away from a RedCap initial BWP to measure an SSB immediately after an unsuccessful RAR window so that the RedCap UE can switch back to the RedCap initial BWP in time to transmit a PRACH preamble during the next RACH occasion.

Figure 7:
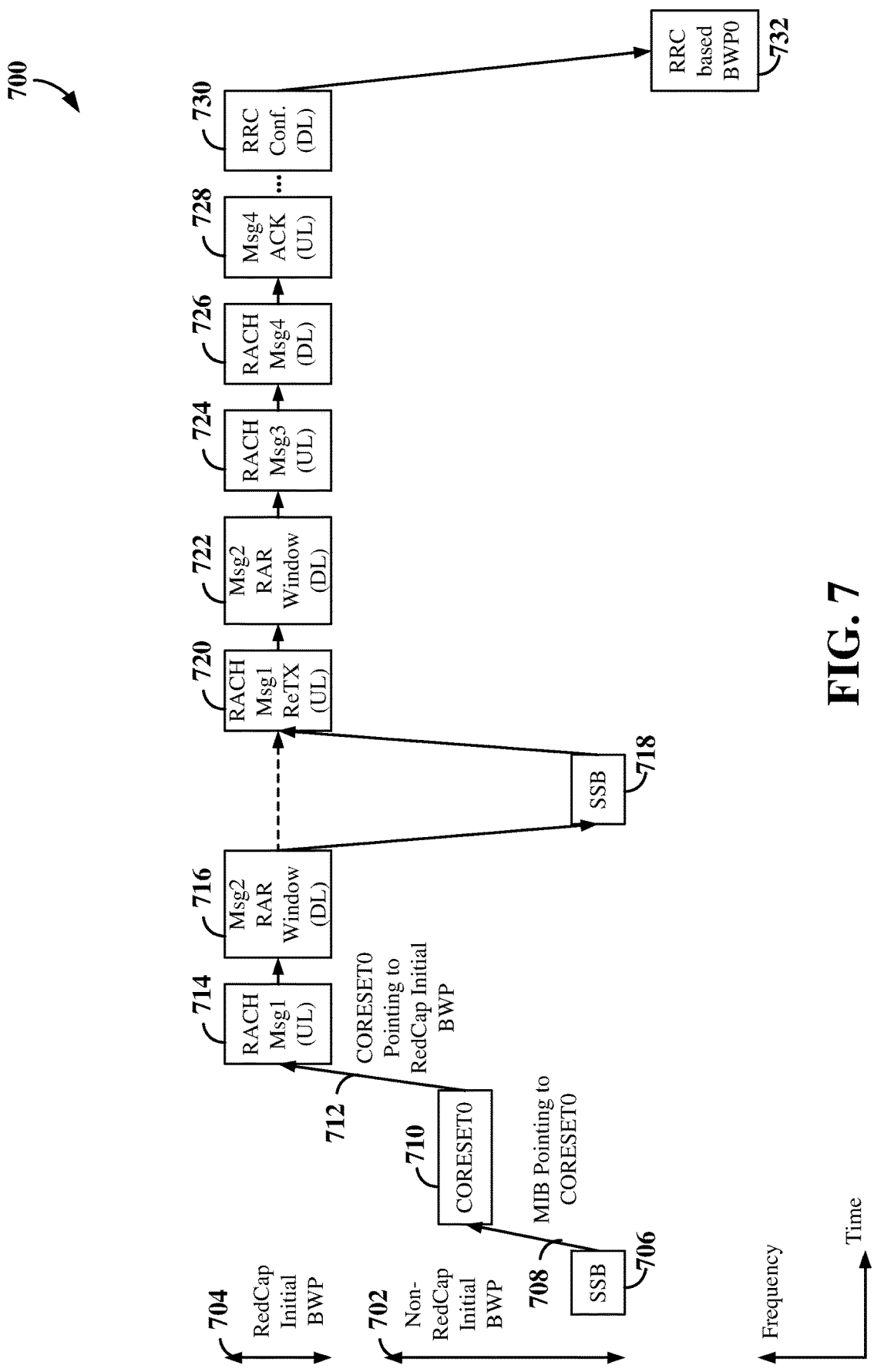
FIG. 7 is a diagram illustrating an example of a RACH procedure for a reduced capability (RedCap) user equipment according to some aspects.

FIG. 7 is a diagram illustrating an example of a RACH procedure 700 for a reduced capability (RedCap) UE according to some aspects. In this example, an initial BWP 702 is defined for non-RedCap UEs and an initial BWP 704 is defined for RedCap UEs.

A Redcap UE (not shown in FIG. 7) monitors the initial BWP 702 for an SSB 706 transmitted by a network entity such as a gNB (not shown in FIG. 7). The SSB 706 includes a MIB that points 708 to CORESET0 710. The CORESET0 710, in turn, points 712 to the initial BWP 704 for the RedCap UE.

As represented by block 714, the RedCap UE transmits a RACH Msg1 (PRACH preamble) on the initial BWP 704. In response, as represented by block 716, the network entity transmits a RACH Msg2 during the designated RAR window on the initial BWP 704.

In the event the RedCap UE does not successfully decode the RACH Msg2 during the RAR window, the RedCap UE may characterize the current RACH attempt as a RACH failure. In this case, the RedCap UE may again monitor the initial BWP 702 for an SSB 718 transmitted by the network entity (e.g., to maintain or reacquire synchronization with the network entity).

As represented by block 720, the RedCap UE may then retransmit the RACH Msg1 (PRACH preamble) on the initial BWP 704. In response, as represented by block 722, the network entity transmits a RACH Msg2 during the designated RAR window on the initial BWP 704. If the RedCap UE successfully receives the RACH Msg2, as represented by block 724, the RedCap UE transmits a RACH Msg3 on the initial BWP 704. In response, as represented by block 726, the network entity transmits a RACH Msg4 during a designated contention resolution (CR) window on the initial BWP 704. If the RedCap UE successfully receives the RACH Msg4, as represented by block 728, the RedCap UE acknowledges the RACH Msg4. As represented by block 730, the RedCap UE and the network entity perform RRC configuration procedures, and ultimately configure a BWP 0 to be used for communication between the RedCap UE and the network entity (block 732).

As discussed above, during the RACH procedure, after transmitting Msg1, the UE monitors for the RAR Msg2 response from the network during the RAR Window. In some examples, this window duration is specified via RACH-ConfigGeneric through the IE ra-ResponseWindow with the maximum duration being 10 ms to 40 ms across all subcarrier spacings. Likewise, after transmitting Msg3, the UE monitors for the Contention Resolution response from the network within a window of configurable length, which is at most 64 subframes in some examples.

Within these windows however, the UE may only be able to monitor for DL signals at certain intervals, as determined by the PDCCH-ConfigCommon IE. Inside this IE, the network includes configurations for numerous search space IDs. The network specifies which among these is the ra-SearchSpace ID, which specifies the valid slots and symbols during which the UE may monitor the RAR and/or CR response during the RACH procedure.

A different IE, TDD-UL-DL-ConfigurationCommon specifies which slots may be used for UL and DL. Within the RAR/CR Window, the UE may only be able to decode Msg2/Msg4 if it is received within a DL slot and/or symbol.

In some examples, a wireless communication specification may mandate that a UE be able to retransmit PRACH Msg1 a certain time after the end of an unsuccessful RAR window. For example, 3GPP TS 38.213 (V 17.0.0) specifies: If the UE does not detect the DCI format 1_0 with CRC scrambled by the corresponding RA-RNTI within the window, or if the UE detects the DCI format 1_0 with CRC scrambled by the corresponding RA-RNTI within the window and least significant bits (LSBs) of a subframe number (SFN) field in the DCI format 1_0, if included and applicable, are not same as corresponding LSBs of the SFN where the UE transmitted PRACH, or if the UE does not correctly receive the transport block in the corresponding PDSCH within the window, or if the higher layers do not identify the random access preamble identifier (RAPID) associated with the PRACH transmission from the UE, the higher layers can indicate to the physical layer to transmit a PRACH. If requested by higher layers, the UE is expected to transmit a PRACH no later than $N_{T,1}$+0.75 ms after the last symbol of the window, or the last symbol of the PDSCH reception, where $N_{T,1}$ is a time duration of $N_1$ symbols corresponding to a PDSCH processing time for UE processing capability 1 assuming µ corresponds to the smallest SCS configuration among the SCS configurations for the PDCCH carrying the DCI format 1_0, the corresponding PDSCH when additional PDSCH DMRS is configured, and the corresponding PRACH. For µ=0, the UE may assume $N_{1,0}$=14. For a PRACH transmission using 1.25 kHz or 5 kHz SCS, the UE determines $N_1$ assuming SCS configuration µ=0.

Depending on how the RACH-ConfigGeneric, TDD-UL-DL-ConfigurationCommon, and PDCCH-CommonConFIG. IEs are configured, the entirety of the RAR or CR window may not be used for DL monitoring. This scenario can be seen with the RAR window in the configuration that follows (e.g., for N41, FR1 TDD band). In RACH-ConfigGeneric, the RAR Monitoring window duration is 10 ms (ra-ResponseWindow s120), and the valid RO slots associated with PRACH-ConfigIndex 17 in each frame are Slots 8, 9, 18, and 19. The preamble format associated with this index is a Long format spanning two adjacent slots, so a RACH Occasion (RO) beginning at Slot 8 extends into Slot 9: prach-ConfigurationIndex 17, ra-ResponseWindow s120. From tdd-UL-DL-ConfigurationCommon, we can observe the UL/DL slot distribution pattern which repeats across all frames. This pattern accommodates the ROs by assigning slots 8, 9, 18, and 19 as full UL slots, while the rest are DL slots within each 20-slot 30 kHz frame: referenceSubcarrierSpacing kHz 30, dl-UL-TransmissionPeriodicity ms5, nrofDownlinkSlots 7, nrofDownlinkSymbols 6, nrofUplinkSlots 2, nrofUplinkSymbols 4. The pdcch-ConfigCommon identifies Search Space ID 1 as the RA-SearchSpace. This search space utilizes monitoring slot periodicity SL1, meaning PDCCH/PDSCH are monitored in each slot. The monitoringSymbols bitmask indicates that only the first symbol of each of these slots is monitored: searchSpaceId 1, monitoringSlotPeriodicityAndOffset sl1: NULL, monitoringSymbolsWithinSlot '10000000 000000'B, ra-SearchSpace 1. The above parameters may be signaled in SIB1.

Figure 8:
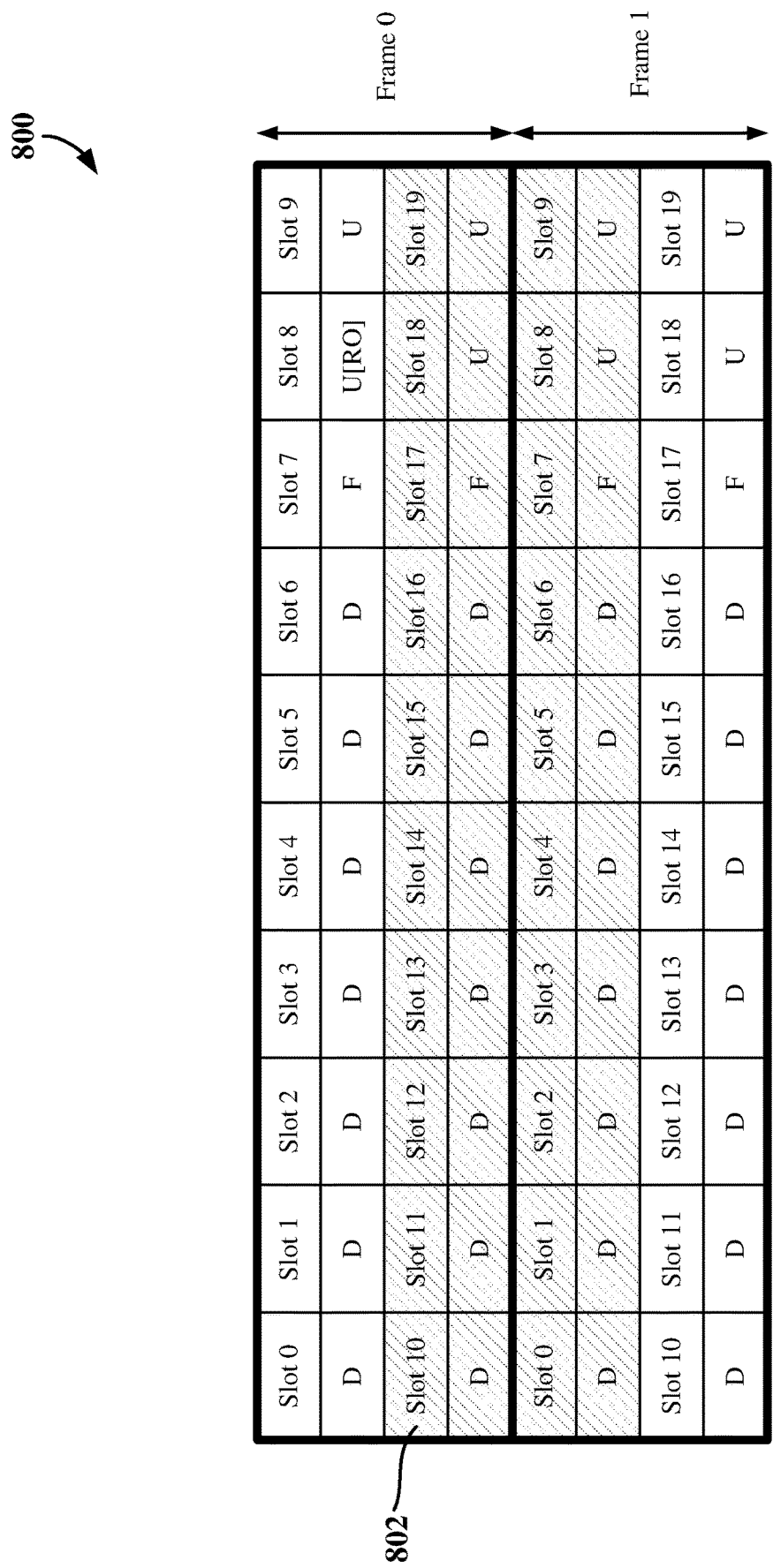
FIG. 8 is a diagram illustrating an example of a slot configuration for a user equipment according to some aspects.

The above configuration information may be better understood with reference to FIG. 8 which illustrates an example of a slot configuration 800 for a user equipment according to some aspects. The entry for each slot is marked with either D, F, or U in FIG. 8 to signify whether the slot is an UL slot, a Flexible slot, or DL slot, respectively, based on the TDD UL DL configuration. Consider a scenario where the next RO is scheduled in Frame 0, Slot 8. This is a Long Preamble Format, so this RO spans into the neighboring slot. The 20 slot RAR window 802 (indicated by shading in FIG. 8) begins at Frame 0, Slot 10 and spans from this slot until Frame 1, Slot 9. However, Frame 1, Slots 8 and 9 are UL slots. It is not possible for any DL signal to be decoded during these slots. Furthermore, Frame 1, Slot 7 is a Flexible slot that is defined to include 6 DL symbols, 6 Flexible symbols, and 2 UL symbols. However, from the PDCCH-CommonConfig, only the first symbol of Frame 1, Slot 7 is valid for monitoring the DL. Therefore, despite the configured RAR window duration of 20 slots ending in Frame 1, Slot 9, the network will not schedule any PDCCH transmission after the very first symbol of Frame 1, Slot 7. By taking advantage of this, UE behavior can be improved as discussed below. The same issues can apply to the Contention Resolution window.

A similar issue may also be seen in the TDD deployment that follows. In RACH-ConfigGeneric, the RAR Monitoring window duration may be 5 ms (ra-ResponseWindow sl10), and the only valid RO in each frame associated with PRACH-ConfigIndex 158 is in Slot 14. This configuration uses short preamble format A2. All short formats are contained within one slot: prach-ConfigurationIndex 158, ra-ResponseWindow sl10. A difference in tdd-UL-DL-ConfigurationCommon for this example is the presence of Pattern 2: referenceSubcarrierSpacing kHz30; Pattern1: nrofDownlinkSlots 7, nrofDownlinkSymbols 6, nrofUplinkSlots 2, nrofUplinkSymbols 4, dl-UL-TransmissionPeriodicity-v1530 ms3; Pattern2: dl-UL-TransmissionPeriodicity ms2, nrofDownlinkSlots 2, nrofDownlinkSymbols 0, nrofUplinkSlots 0, nrofUplinkSymbols 0. The pdcch-ConfigCommon is identical to the previous example with regards to the random access (RA) Search Space: searchSpaceId 1, monitoringSlotPeriodicityAndOffset sl1: NULL, monitoringSymbolsWithinSlot '10000000 000000'B, ra-SearchSpace 1. The above parameters may be signaled in SIB1.

Figure 9:
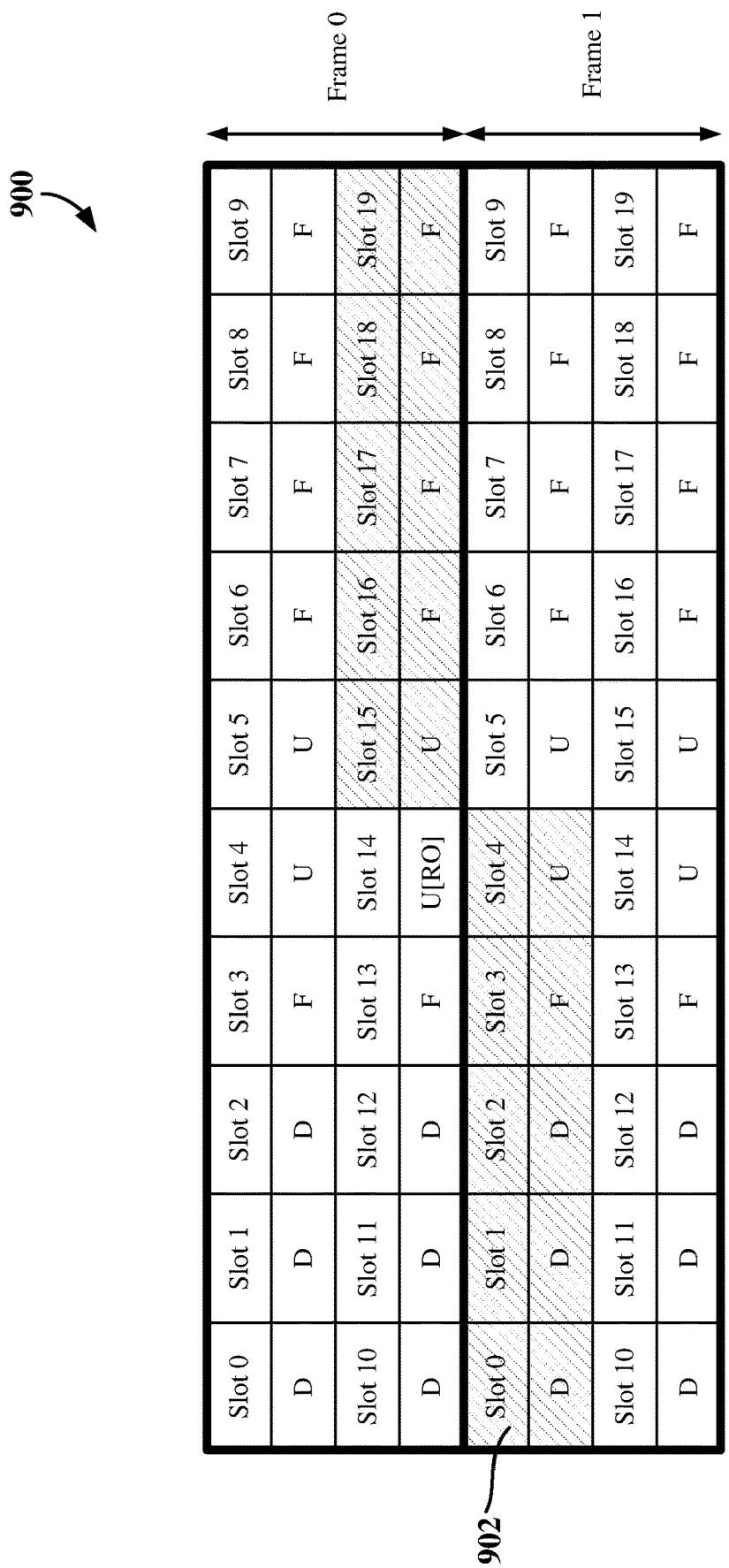
FIG. 9 is a diagram illustrating another example of a slot configuration for a user equipment according to some aspects.

The above configuration information may be better understood with reference to FIG. 9 which illustrates an example of a slot configuration 900 for a user equipment according to some aspects. The only valid RO for each frame is in Slot 14, so the RAR Window 902 (indicated by shading in FIG. 9) begins at Slot 15 of Frame 0 and ends at Slot 4 of Frame 1 (a total of 10 slots). As seen in the search space configuration, only the first symbol of each slot is valid for DL monitoring. The final monitoring occasion is in the first symbol of Slot 3 of Frame 1 since Slot 4 of Frame 1 is an UL slot. This configuration presents the same issue as the previous one: the network will not schedule any DL transmissions within the final millisecond (approximately) of the RAR Window, but the UE continues monitoring during this time.

The disclosure relates in some aspects to aborting a RACH attempt before the end of the random access window. In some aspects, this approach may be based on the RACH type. In one example (except for PDCCH ordered RACH), when the RAR window is started, the UE can identify the last PDCCH occasion which is carrying RA-Searchspeace and if no DL DCI 1_0 scrambled with RA-RNTI is decoded, then the UE can characterize the current attempt as a RACH failure and proceed with the next RACH attempt. In another example (PDCCH ordered RACH), the UE can identify the last PDCCH occasion where the UE can decode DL DCI (1_0) scrambled with C-RNTI and if no DCI is decoded then the UE can characterize the current attempt as a failure and proceed with the next RACH attempt. A similar approach may be used for Msg4 monitoring.

In some aspects, this approach may reduce RACH procedure latency. Once the final DL monitoring occasion has elapsed within either monitoring window, there is no benefit from continuing to monitor for Msg2/Msg4; while the UE monitors for the DL response, the RACH procedure is brought to a complete standstill until either Msg2/Msg4 are received, or the window duration expires. However, if there is no opportunity for DL monitoring for the remainder of the window it is not necessary to continue delaying the RACH procedure to wait for an event which is no longer possible.

Figure 10:
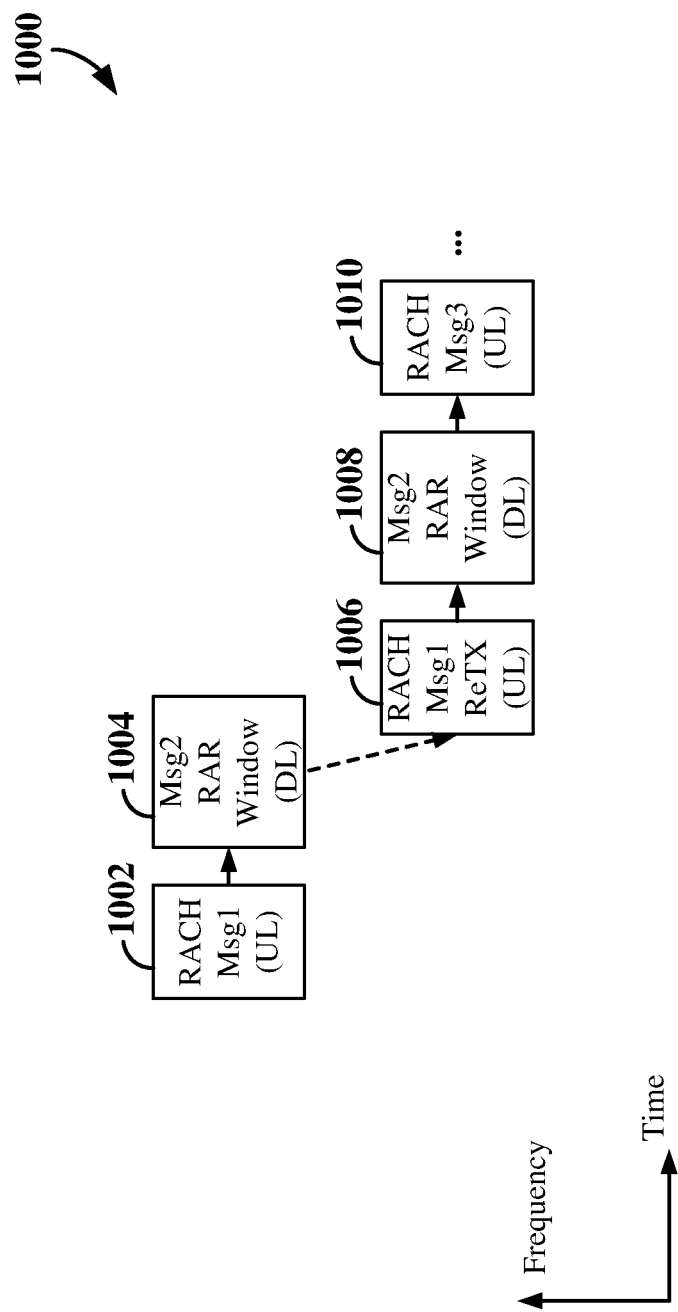
FIG. 10 is a diagram illustrating an example of a RACH procedure for a user equipment according to some aspects.

FIG. 10 is a diagram illustrating an example of a RACH procedure 1000 for a user equipment according to some aspects. As represented by block 1002, a UE transmits a RACH Msg1 (PRACH preamble). In response, as represented by block 1004, the network entity transmits a RACH Msg2 during the designated RAR window.

In the event the UE does not successfully decode the RACH Msg2 during the RAR window and there are no remaining downlink symbols during the RAR window, the UE may characterize the current RACH attempt as a RACH failure prior to the expiry of the RAR window. In this case, as represented by block 1006, the UE may retransmit the RACH Msg1 (PRACH preamble). As shown in FIG. 10, in some examples, the retransmission of the RACH Msg1 may commence during the RAR window (e.g., during one or more uplink slots at the end of the RAR window).

As represented by block 1008, in response to the retransmitted RACH Msg1, the network entity transmits a RACH Msg2 during the designated RAR window. If the UE successfully receives the RACH Msg2, as represented by block 1010, the UE transmits a RACH Msg3. The RACH procedure may then continue (e.g., as discussed herein).

Figure 11:
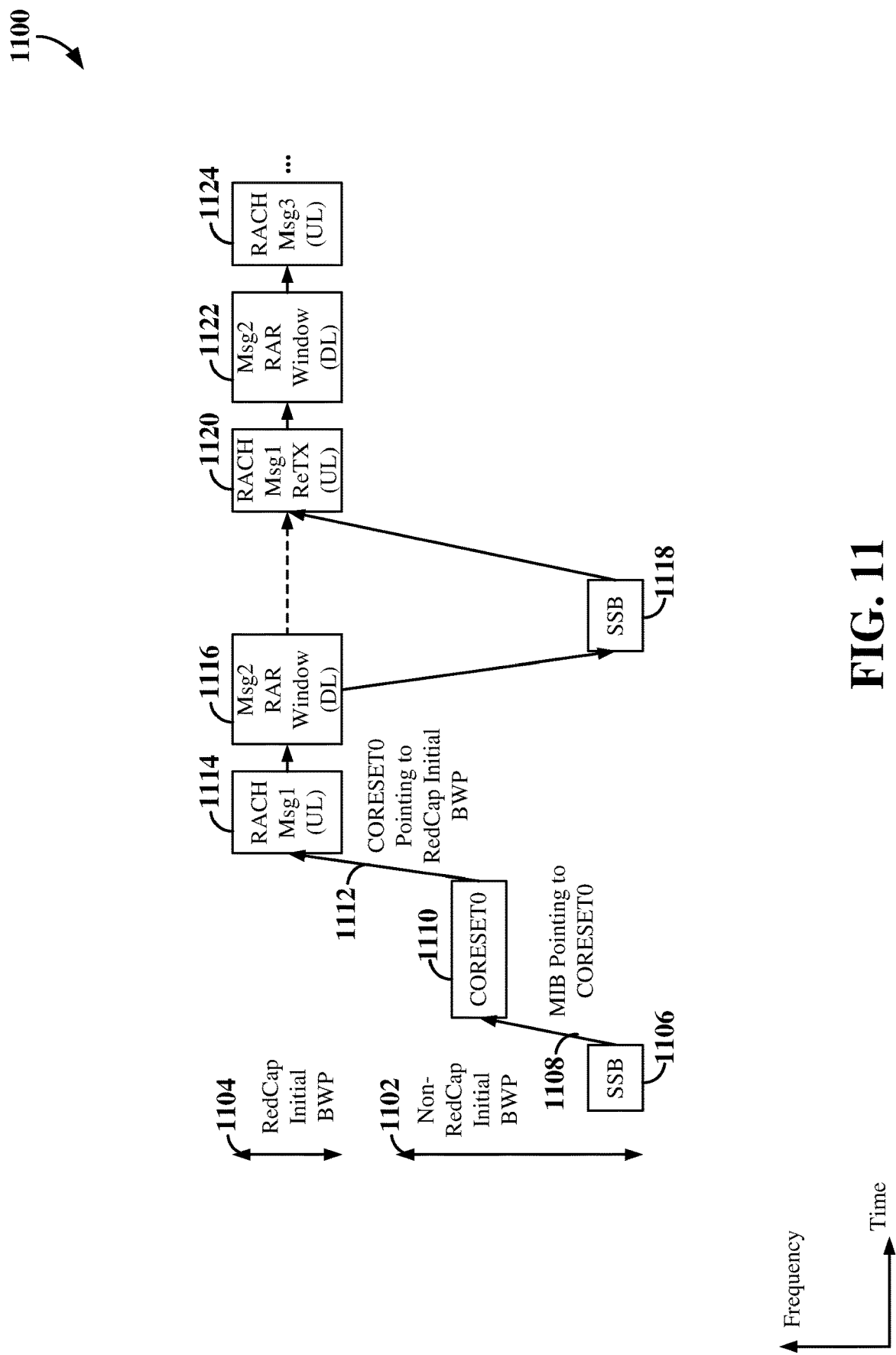
FIG. 11 is a diagram illustrating another example of a RACH procedure for a reduced capability (RedCap) user equipment according to some aspects.

FIG. 11 is a diagram illustrating another example of a RACH procedure 1100 for a reduced capability (RedCap) user equipment according to some aspects. As in the example of FIG. 7, an initial BWP 1102 is defined for non-RedCap UEs and an initial BWP 1104 is defined for RedCap UEs. In this example, the RedCap UE does not have to wait until the end of RAR window to initiate switching away from the initial BWP 1104 to retrieve SSB signaling in the initial BWP 1102. The RedCap UE may switch away immediately after the last PDCCH occasion carrying RA-Searchspeace within the RAR window if it has not received RA-RNTI by that period.

A Redcap UE (not shown in FIG. 11) monitors the initial BWP 1102 for an SSB 1106 transmitted by a network entity such as a gNB (not shown in FIG. 11). The SSB 1106 includes a MIB that points 1108 to CORESET0 1110. The CORESET0 1110, in turn, points 1112 to the initial BWP 1104 for the RedCap UE.

As represented by block 1114, the RedCap UE transmits a RACH Msg1 (PRACH preamble) on the initial BWP 1104. In response, as represented by block 1116, the network entity transmits a RACH Msg2 during the designated RAR window on the initial BWP 1104.

In the event the RedCap UE does not successfully decode the RACH Msg2 during the RAR window and there are no remaining downlink symbols during the RAR window, the RedCap UE may characterize the current RACH attempt as a RACH failure prior to the expiry of the RAR window. In this case, the RedCap UE may again monitor the initial BWP 1102 for an SSB 1118 transmitted by the network entity (e.g., to maintain or reacquire synchronization with the network entity). As shown in FIG. 11, in some examples, this SSB monitoring may commence during the RAR window (e.g., during one or more uplink slots at the end of the RAR window).

As represented by block 1120, the RedCap UE may then retransmit the RACH Msg1 (PRACH preamble) on the initial BWP 1104. In response, as represented by block 1122, the network entity transmits a RACH Msg2 during the designated RAR window on the initial BWP 1104. If the RedCap UE successfully receives the RACH Msg2, as represented by block 1124, the RedCap UE transmits a RACH Msg3 on the initial BWP 1104. The RACH procedure may then continue as discussed herein (e.g., in conjunction with FIG. 7).

Figure 12:
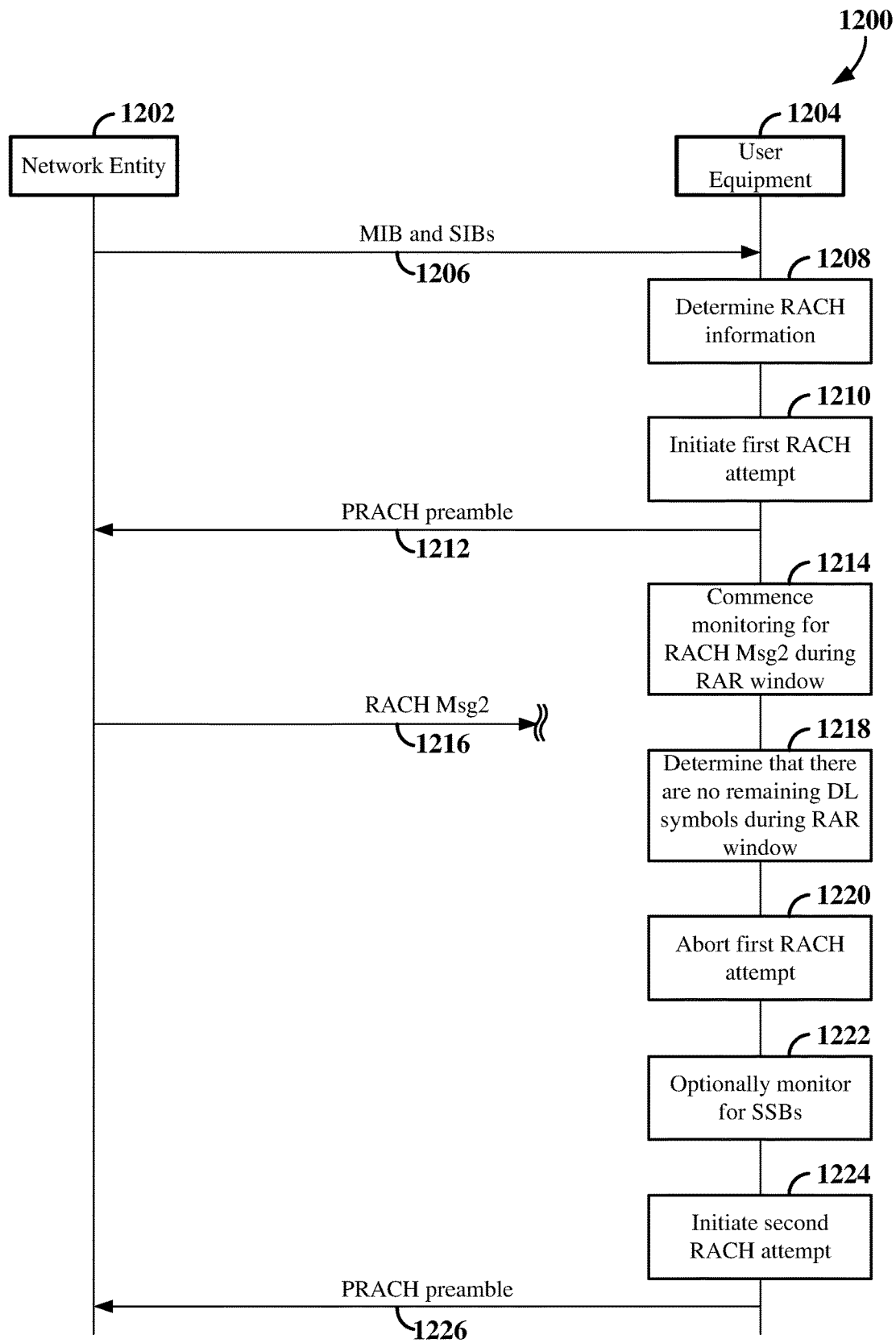
FIG. 12 is a signaling diagram illustrating an example of RACH-related signaling according to some aspects.

FIG. 12 is a signaling diagram illustrating an example of RACH-related signaling 1200 in a wireless communication system including a network entity (e.g., a base station) 1202 and a user equipment 1204. In some examples, the network entity 1202 may correspond to any of the network entities, base stations, CUs, DUs, RUs, or scheduling entities shown in any of FIGS. 1, 2, 3, 6, 13, and 16. In some examples, the user equipment 1204 may correspond to any of the UEs or scheduled entities shown in any of FIGS. 1, 2, 3, 6, 13, and 14.

At #1206 of FIG. 12, the network entity 1202 broadcasts MIB, SIB, and other signaling that is received by the user equipment 1204. As discussed above, SIB1 may include RACH parameters that the user equipment 1204 may use for RACH procedures. In addition, the network entity 1202 may configure BWPs, search spaces, and other resources for communication between the user equipment 1204 and the network entity 1202.

At #1208, the user equipment 1204 determines RACH information for at least one RACH procedure. For example, based on parameters from SIB1, the user equipment 1204 may identify the slots corresponding to at least one random access window (e.g., a RAR window and a contention resolution (CR) window).

At #1210, the user equipment 1204 initiates a first RACH attempt. Accordingly, at #1212, the user equipment 1204 sends a PRACH preamble to the network entity 1202.

At #1214, the user equipment 1204 commences monitoring for a RACH Msg2 during an RAR window. For example, the user equipment 1204 may monitor downlink slots on designated RACH occasions (ROs) starting at the beginning of the RAR window.

At #1216, the network entity 1202 may transmit the RACH Msg2 (e.g., on a particular RO). For one or more reasons (e.g., poor channel conditions), the user equipment 1204 may be unable to decode the RACH Msg2. Alternatively, the network entity 1202 might not transmit the RACH Msg2 (e.g., due to the network entity 1202 not successfully decoding the PRACH preamble sent at #1212).

In either case, at #1218, the user equipment 1204 may determine during the RAR window that there are no remaining DL symbols in the RAR window. Thus, at #1220, since the user equipment 1204 has not successfully decoded the RACH Msg2 and there are no more opportunities to do so in the RAR window, the user equipment 1204 may abort the first RACH attempt prior to the expiry of the RAR window.

At optional #1222, for a scenario where the user equipment 1204 is a RedCap UE, the user equipment 1204 may monitor for SSB signaling from the network entity 1202 (e.g., to maintain or reacquire synchronization with the network entity 1202). In some examples, the user equipment 1204 may monitor for the SSB signaling during the RAR window (e.g., on uplink slots at the end of the RAR window).

At #1224, the user equipment 1204 initiates a second RACH attempt. Accordingly, at #1226, the user equipment 1204 retransmits the PRACH preamble to the network entity 1202. In some examples, the user equipment 1204 may retransmit the PRACH preamble during the RAR window (e.g., on uplink slots at the end of the RAR window).

Figure 13:
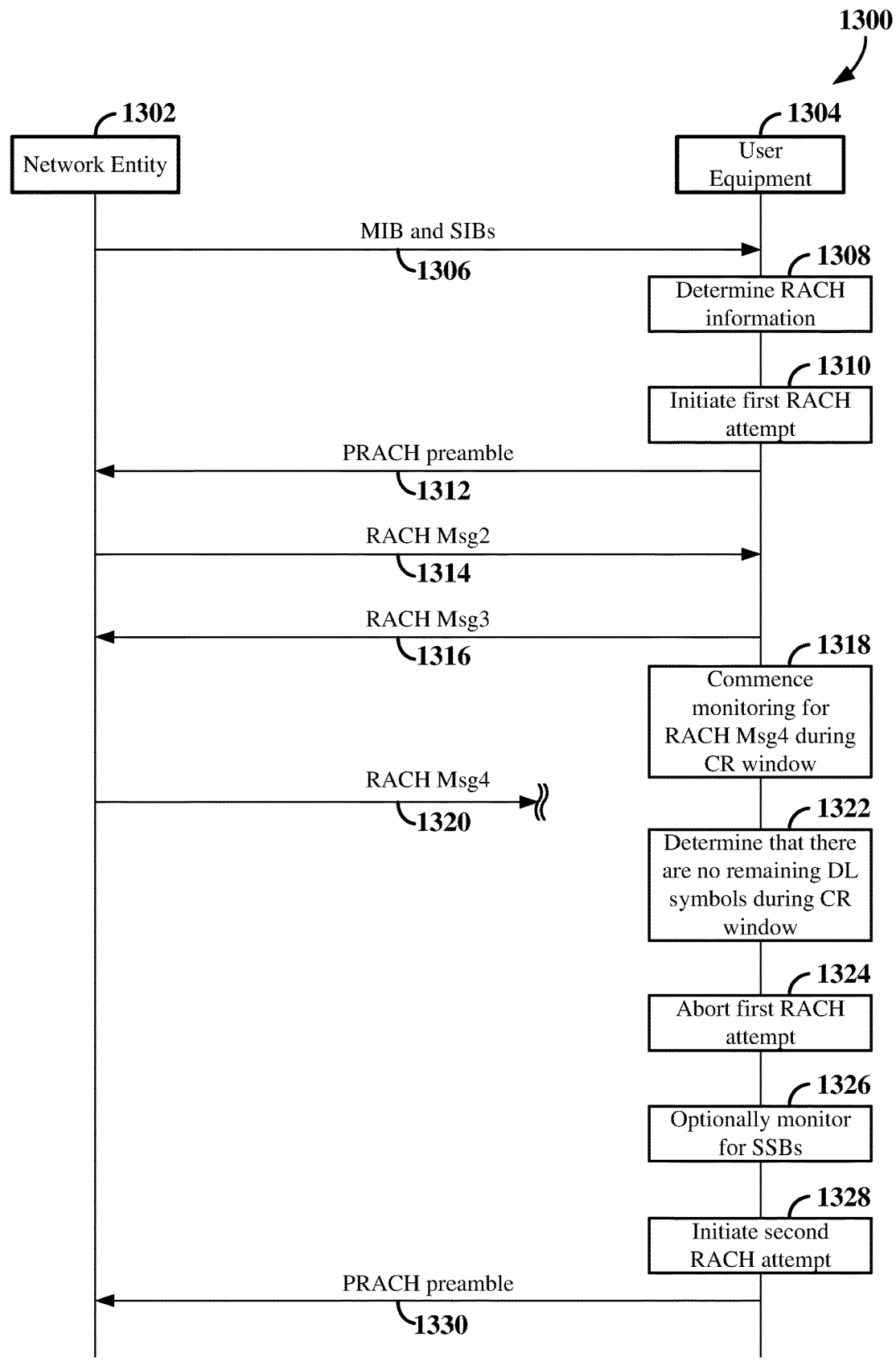
FIG. 13 is a signaling diagram illustrating another example of RACH-related signaling according to some aspects.

FIG. 13 is a signaling diagram illustrating an example of RACH-related signaling 1300 in a wireless communication system including a network entity (e.g., a base station) 1302 and a user equipment 1304. In some examples, the network entity 1302 may correspond to any of the network entities, base stations, CUs, DUs, RUs, or scheduling entities shown in any of FIGS. 1, 2, 3, 6, 12, and 16. In some examples, the user equipment 1304 may correspond to any of the UEs or scheduled entities shown in any of FIGS. 1, 2, 3, 6, 12, and 14.

At #1306 of FIG. 13, the network entity 1302 broadcasts MIB, SIB, and other signaling that is received by the user equipment 1304. As discussed above, SIB1 may include RACH parameters that the user equipment 1304 may use for RACH procedures. In addition, the network entity 1302 may configure BWPs, search spaces, and other resources for communication between the user equipment 1304 and the network entity 1302.

At #1308, the user equipment 1304 determines RACH information for at least one RACH procedure. For example, based on parameters from SIB1, the user equipment 1304 may identify the slots corresponding to at least one random access window (e.g., a RAR window and a contention resolution (CR) window).

At #1310, the user equipment 1304 initiates a first RACH attempt. Accordingly, at #1312, the user equipment 1304 sends a PRACH preamble to the network entity 1302.

At #1314, the network entity 1302 transmits a RACH Msg2 to the user equipment 1304 in response to the PRACH preamble. Then, at #1316, the user equipment 1304 transmits a RACH Msg3 to the network entity 1302.

At #1318, the user equipment 1304 commences monitoring for a RACH Msg4 during a CR window. For example, the user equipment 1304 may monitor downlink slots on designated RACH occasions (ROs) starting at the beginning of the CR window.

At #1320, the network entity 1302 may transmit the RACH Msg4 (e.g., on a particular RO). For one or more reasons (e.g., poor channel conditions), the user equipment 1304 may be unable to decode the RACH Msg4. Alternatively, the network entity 1302 might not transmit the RACH Msg4 (e.g., due to the network entity 1302 not successfully decoding the RACH Msg3 sent at #1316).

In either case, at #1322, the user equipment 1304 may determine during the RAR window that there are no remaining DL symbols in the CR window. Thus, at #1324, since the user equipment 1304 has not successfully decoded the RACH Msg4 and there are no more opportunities to do so in the CR window, the user equipment 1304 may abort the first RACH attempt prior to the expiry of the CR window.

At optional #1326, for a scenario where the user equipment 1304 is a RedCap UE, the user equipment 1304 may monitor for SSB signaling from the network entity 1302 (e.g., to maintain or reacquire synchronization with the network entity 1302). In some examples, the user equipment 1304 may monitor for the SSB signaling.

At #1328, the user equipment 1304 initiates a second RACH attempt. Accordingly, at #1330, the user equipment 1304 retransmits the PRACH preamble to the network entity 1302. In some examples, the user equipment 1304 may retransmit the PRACH preamble during the CR window (e.g., on uplink slots at the end of the CR window).

In view of the above, in some examples, a wireless communication specification may enforce a UE to transmit a PRACH at an earlier time after an unsuccessful RAR window. This allows the network to reduce the UE's RACH procedure latency and will be useful in handover, PDCCH ordered RACH, etc.

As one example, the following procedure may be specified: If the UE does not detect the DCI format 1_0 with CRC scrambled by the corresponding RA-RNTI within the window, or if the UE detects the DCI format 1_0 with CRC scrambled by the corresponding RA-RNTI within the window and LSBs of a SFN field in the DCI format 1_0, if included and applicable, are not same as corresponding LSBs of the SFN where the UE transmitted PRACH, or if the UE does not correctly receive the transport block in the corresponding PDSCH within the window, or if the higher layers do not identify the RAPID associated with the PRACH transmission from the UE, the higher layers can indicate to the physical layer to transmit a PRACH. If requested by higher layers, the UE is expected to transmit a PRACH no later than $N_{T,1}$+0.75 msec after the last symbol of the last PDCCH occasion which is carrying RA-Searchspace within the window, or the last symbol of the PDSCH reception, where $N_{T,1}$ is a time duration of $N_1$ symbols corresponding to a PDSCH processing time for UE processing capability 1 assuming μ corresponds to the smallest SCS configuration among the SCS configurations for the PDCCH carrying the DCI format 1_0, the corresponding PDSCH when additional PDSCH DM-RS is configured, and the corresponding PRACH. For μ=0, the UE assumes $N_{1,0}$=14 [6, TS 38.214]. For a PRACH transmission using 1.25 kHz or 5 kHz SCS, the UE determines $N_1$ assuming SCS configuration μ=0.

Figure 14:
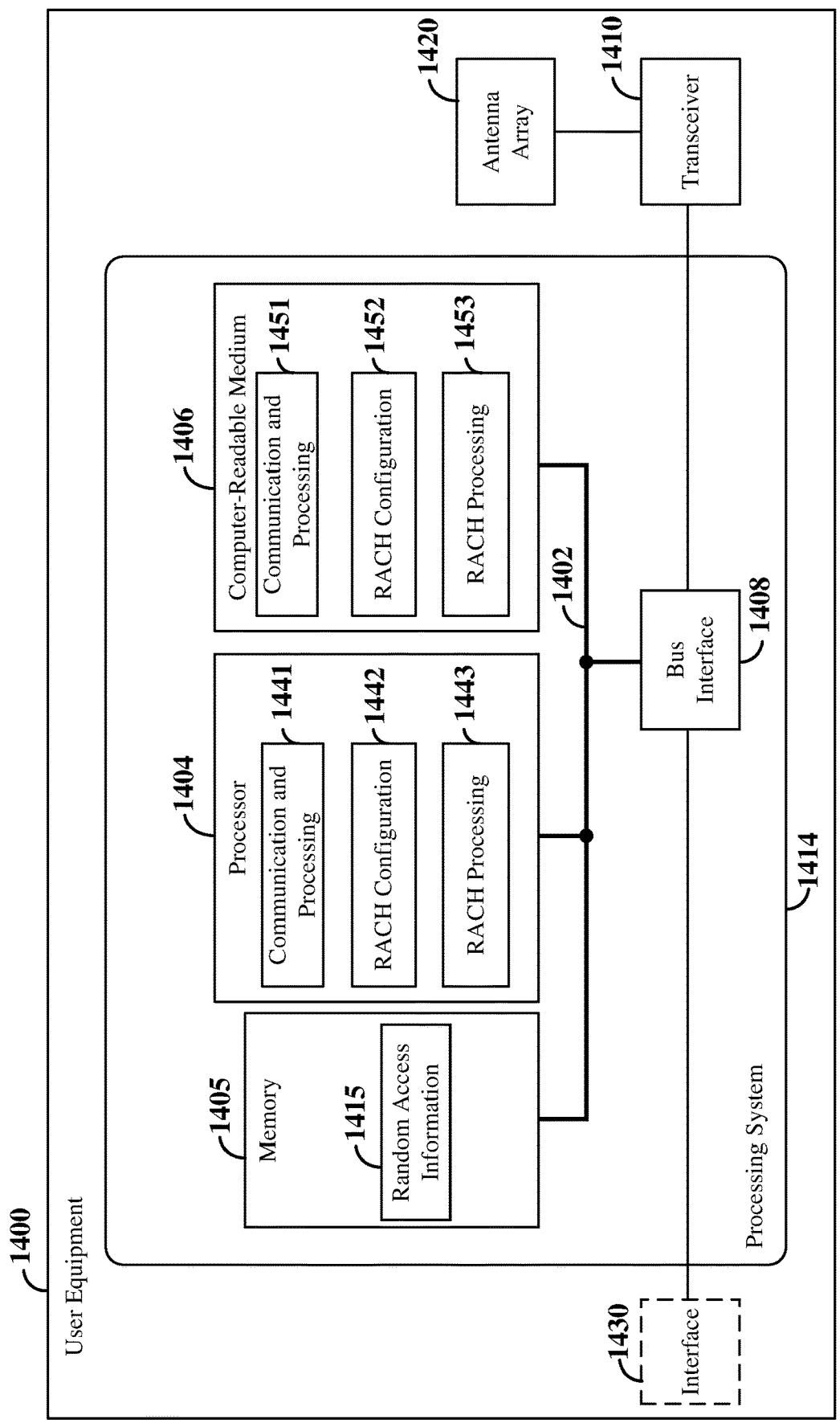
FIG. 14 is a block diagram conceptually illustrating an example of a hardware implementation for a user equipment employing a processing system according to some aspects.

FIG. 14 is a block diagram illustrating an example of a hardware implementation for a UE 1400 employing a processing system 1414. For example, the UE 1400 may be a device configured to wirelessly communicate with a network entity, as discussed in any one or more of FIGS. 1-13. In some implementations, the UE 1400 may correspond to any of the UEs or scheduled entities shown in any of FIGS. 1, 2, 3, 6, 12, and 13.

In accordance with various aspects of the disclosure, an element, or any portion of an element, or any combination of elements may be implemented with the processing system 1414. The processing system 1414 may include one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1400 may be configured to perform any one or more of the functions described herein. That is, the processor 1404, as utilized in a UE 1400, may be used to implement any one or more of the processes and procedures described herein.

The processor 1404 may in some instances be implemented via a baseband or modem chip and in other implementations, the processor 1404 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402, a transceiver 1410 and an antenna array 1420 and between the bus 1402 and an interface 1430. The transceiver 1410 provides a communication interface or means for communicating with various other apparatus over a wireless transmission medium. The interface 1430 provides a communication interface or means of communicating with various other apparatuses and devices (e.g., other devices housed within the same apparatus as the UE 1400 or other external apparatuses) over an internal bus or external transmission medium, such as an Ethernet cable. Depending upon the nature of the apparatus, the interface 1430 may include a user interface (e.g., keypad, display, speaker, microphone, joystick). Of course, such a user interface is optional, and may be omitted in some examples, such as an IoT device.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may store random access information 1415 (e.g., RACH configuration information) used by the processor 1404 for the communication operations described herein.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1400 may be configured to perform any one or more of the operations described herein (e.g., as described above in conjunction with FIGS. 1-13 and as described below in conjunction with FIG. 15). In some aspects of the disclosure, the processor 1404, as utilized in the UE 1400, may include circuitry configured for various functions.

The processor 1404 may include communication and processing circuitry 1441. The communication and processing circuitry 1441 may be configured to communicate with a network entity, such as a gNB. The communication and processing circuitry 1441 may be configured to communicate with a base station and one or more other wireless communication devices over a common carrier shared between a cellular (e.g., Uu) interface and a sidelink (e.g., PC5) interface. The communication and processing circuitry 1441 may include one or more hardware components that provide the physical structure that performs various processes related to wireless communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. In some examples, the communication and processing circuitry 1441 may include two or more transmit/receive chains (e.g., one chain to communicate with a base station and another chain to communicate with a sidelink device). The communication and processing circuitry 1441 may further be configured to execute communication and processing software 1451 included on the computer-readable medium 1406 to implement one or more functions described herein.

In some implementations where the communication involves receiving information, the communication and processing circuitry 1441 may obtain information from a component of the UE 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may receive one or more of signals, messages, SCIs, feedback, other information, or any combination thereof. In some examples, the communication and processing circuitry 1441 may receive information via one or more of a PSCCH, a PSSCH, a PSFCH, some other type of channel, or any combination thereof. In some examples, the communication and processing circuitry 1441 may include functionality for a means for receiving. In some examples, the communication and processing circuitry 1441 may include functionality for a means for decoding. In some examples, the communication and processing circuitry 1441 may include functionality for a means for monitoring for SSB signaling.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may send one or more of signals, messages, SCIs, feedback, other information, or any combination thereof. In some examples, the communication and processing circuitry 1441 may send information via one or more of a PSCCH, a PSSCH, a PSFCH, some other type of channel, or any combination thereof. In some examples, the communication and processing circuitry 1441 may include functionality for a means for sending (e.g., a means for transmitting). In some examples, the communication and processing circuitry 1441 may include functionality for a means for encoding.

The processor 1404 may include RACH configuration circuitry 1442 configured to perform RACH configuration-related operations as discussed herein (e.g., one or more of the operations described above in conjunction with FIGS. 7-13). The RACH configuration circuitry 1442 may be configured to execute RACH configuration software 1452 included on the computer-readable medium 1406 to implement one or more functions described herein.

The RACH configuration circuitry 1442 may include functionality for a means for receiving parameters (e.g., as described above in conjunction with FIGS. 7-13). For example, the RACH configuration circuitry 1442 may cooperate with the communication and processing circuitry 1441 to receive a SIB1 including RACH parameters from a network entity.

The processor 1404 may include RACH processing circuitry 1443 configured to perform RACH processing-related operations as discussed herein (e.g., one or more of the operations described above in conjunction with FIGS. 7-13). The RACH processing circuitry 1443 may be configured to execute RACH processing software 1453 included on the computer-readable medium 1406 to implement one or more functions described herein.

The RACH processing circuitry 1443 may include functionality for a means for receiving a RACH message (e.g., as described above in conjunction with FIGS. 7-13). For example, the RACH processing circuitry 1443 may cooperate with the communication and processing circuitry 1441 to receive a RACH Msg2, a RACH Msg4, etc., from a network entity on designated RACH resources (e.g., RACH occasions).

The RACH configuration circuitry 1442 may include functionality for a means for transmitting a RACH message (e.g., as described above in conjunction with FIGS. 7-13). For example, the RACH processing circuitry 1443 may cooperate with the communication and processing circuitry 1441 to transmit a RACH Msg1, a RACH Msg3, etc., to a network entity on designated RACH resources.

The RACH configuration circuitry 1442 may include functionality for a means for determining that a RACH message has not been successfully decoded (e.g., as described above in conjunction with FIGS. 7-13). For example, the RACH processing circuitry 1443 may determine that a RACH downlink message has not been successfully decoded during a random access window.

The RACH configuration circuitry 1442 may include functionality for a means for determining that there are no remaining downlink symbols during a random access window (e.g., as described above in conjunction with FIGS. 7-13). For example, the RACH processing circuitry 1443 may determine that there are no remaining downlink symbols available during a RAR window for receiving a RACH Msg2. As another example, the RACH processing circuitry 1443 may determine that there are no remaining downlink symbols available during a CR window for receiving a RACH Msg4.

Figure 15:
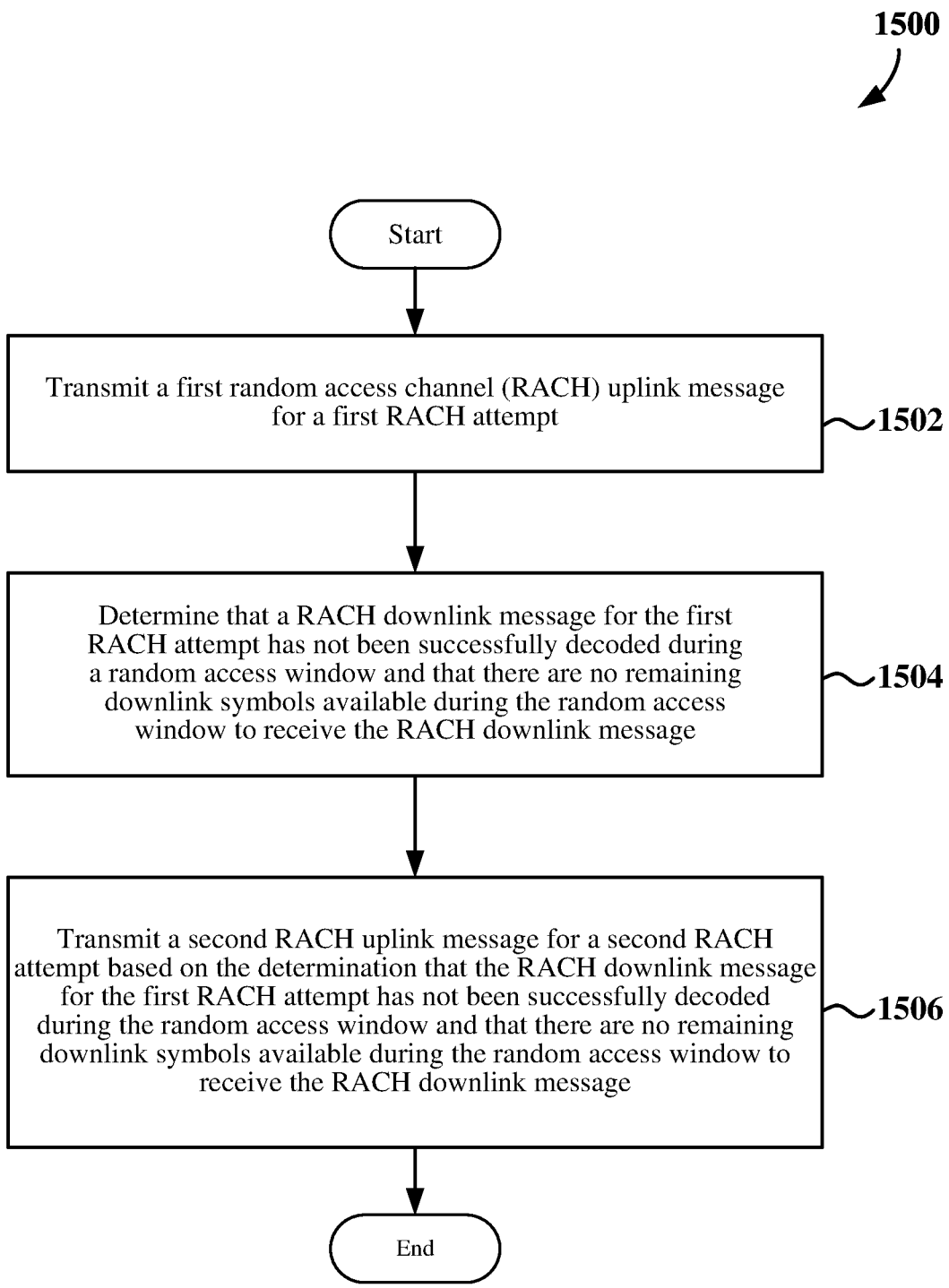
FIG. 15 is a flow chart illustrating an example wireless communication method involving RACH signaling according to some aspects.

FIG. 15 is a flow chart illustrating an example method 1500 for wireless communication in accordance with some aspects of the present disclosure. As described below, some or all illustrated features may be omitted in a particular implementation within the scope of the present disclosure, and some illustrated features may not be required for implementation of all examples. In some examples, the method 1500 (method for wireless communication) may be carried out by the UE 1400 illustrated in FIG. 14. In some examples, the method 1500 may be carried out by any suitable apparatus or means for carrying out the functions or algorithm described below.

At block 1502, a user equipment may transmit a first random access channel (RACH) uplink message for a first RACH attempt. In some examples, the RACH processing circuitry 1443 together with the communication and processing circuitry 1441 and the transceiver 1410, shown and described in FIG. 14, may provide a means to transmit a first random access channel (RACH) uplink message for a first RACH attempt.

At block 1504, the user equipment may determine that a RACH downlink message for the first RACH attempt has not been successfully decoded during a random access window and that there are no remaining downlink symbols available during the random access window to receive the RACH downlink message. In some examples, the RACH processing circuitry 1443, shown and described in FIG. 14, may provide a means to determine that a RACH downlink message for the first RACH attempt has not been successfully decoded during a random access window and that there are no remaining downlink symbols available during the random access window to receive the RACH downlink message.

At block 1506, the user equipment may transmit a second RACH uplink message for a second RACH attempt based on the determination that the RACH downlink message for the first RACH attempt has not been successfully decoded during the random access window and that there are no remaining downlink symbols available during the random access window to receive the RACH downlink message. In some examples, the RACH processing circuitry 1443 together with the communication and processing circuitry 1441 and the transceiver 1410, shown and described in FIG. 14, may provide a means to transmit a second RACH uplink message for a second RACH attempt based on the determination that the RACH downlink message for the first RACH attempt has not been successfully decoded during the random access window and that there are no remaining downlink symbols available during the random access window to receive the RACH downlink message.

In some examples, the second RACH uplink message is transmitted during the random access window.

In some examples, the user equipment may monitor for synchronization signal block signaling after determining that the RACH downlink message for the first RACH attempt has not been successfully decoded during the random access window and that there are no remaining downlink symbols available during the random access window to receive the RACH downlink message. In some examples, the user equipment may transmit the second RACH uplink message after monitoring for the synchronization signal block signaling.

In some examples, to determine that the RACH downlink message for the first RACH attempt has not been successfully decoded during the random access window, the user equipment may determine that downlink control information (DCI) scrambled with a random access radio network temporary identifier (RA-RNTI) has not been successfully decoded during the random access window.

In some examples, to determine that the RACH downlink message has not been successfully decoded during the random access window, the user equipment may determine that downlink control information (DCI) scrambled with a cell radio network temporary identifier (C-RNTI) has not been successfully decoded during the random access window.

In some examples, to determine that there are no remaining downlink symbols available during the random access window to receive the RACH downlink message, the user equipment may determine whether there are any remaining slots within the random access window that are designated as downlink slots by a time division duplex uplink downlink configuration.

In some examples, to determine that there are no remaining downlink symbols available during the random access window to receive the RACH downlink message, the user equipment may determine whether all remaining slots within the random access window are designated as uplink slots by a time division duplex uplink downlink configuration.

In some examples, to determine that there are no remaining downlink symbols available during the random access window to receive the RACH downlink message, the user equipment identifies (e.g., may be configured for identifying) a last physical downlink control channel occasion that is carrying a random access search space within the random access window.

In some examples, the first RACH uplink message may include (e.g., comprises or may comprise) a physical random access channel (PRACH) preamble. In some examples, the random access window may include a random access response (RAR) window. In some examples, the RACH downlink message may include a RACH message 2.

In some examples, the first RACH uplink message may include a RACH message 3. In some examples, the random access window may include a contention resolution window. In some examples, the RACH downlink message may include a RACH message 4.

In some examples, the first RACH uplink message may include a physical random access channel (PRACH) preamble. In some examples, the second RACH uplink message may include a retransmission of the PRACH preamble.

In some examples, the first RACH uplink message may include a RACH message 3. In some examples, the second RACH uplink message may include a retransmission of a physical random access channel (PRACH) preamble.

In some examples, the user equipment may receive a plurality of parameters that define the random access window. In some examples, the plurality of parameters may include a random access window duration parameter. In some examples, the plurality of parameters may include a random access search space identifier that specifies slots and symbols for the user equipment to monitor during the random access window. In some examples, the plurality of parameters may include a time division duplex uplink downlink configuration that specifies a plurality of uplink slots and a plurality of downlink slots.

Referring again to FIG. 14, in one configuration, the UE 1400 includes means for transmitting a first random access channel (RACH) uplink message for a first RACH attempt, means for determining that a RACH downlink message for the first RACH attempt has not been successfully decoded during a random access window and that there are no remaining downlink symbols available during the random access window to receive the RACH downlink message, and means for transmitting a second RACH uplink message for a second RACH attempt based on the determination that the RACH downlink message for the first RACH attempt has not been successfully decoded during the random access window and that there are no remaining downlink symbols available during the random access window to receive the RACH downlink message. In one aspect, the aforementioned means may be the processor 1404 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS. 1, 2, 3, 6, 12, 13, and 14, and utilizing, for example, the methods and/or algorithms described herein in relation to FIG. 15.

Figure 16:
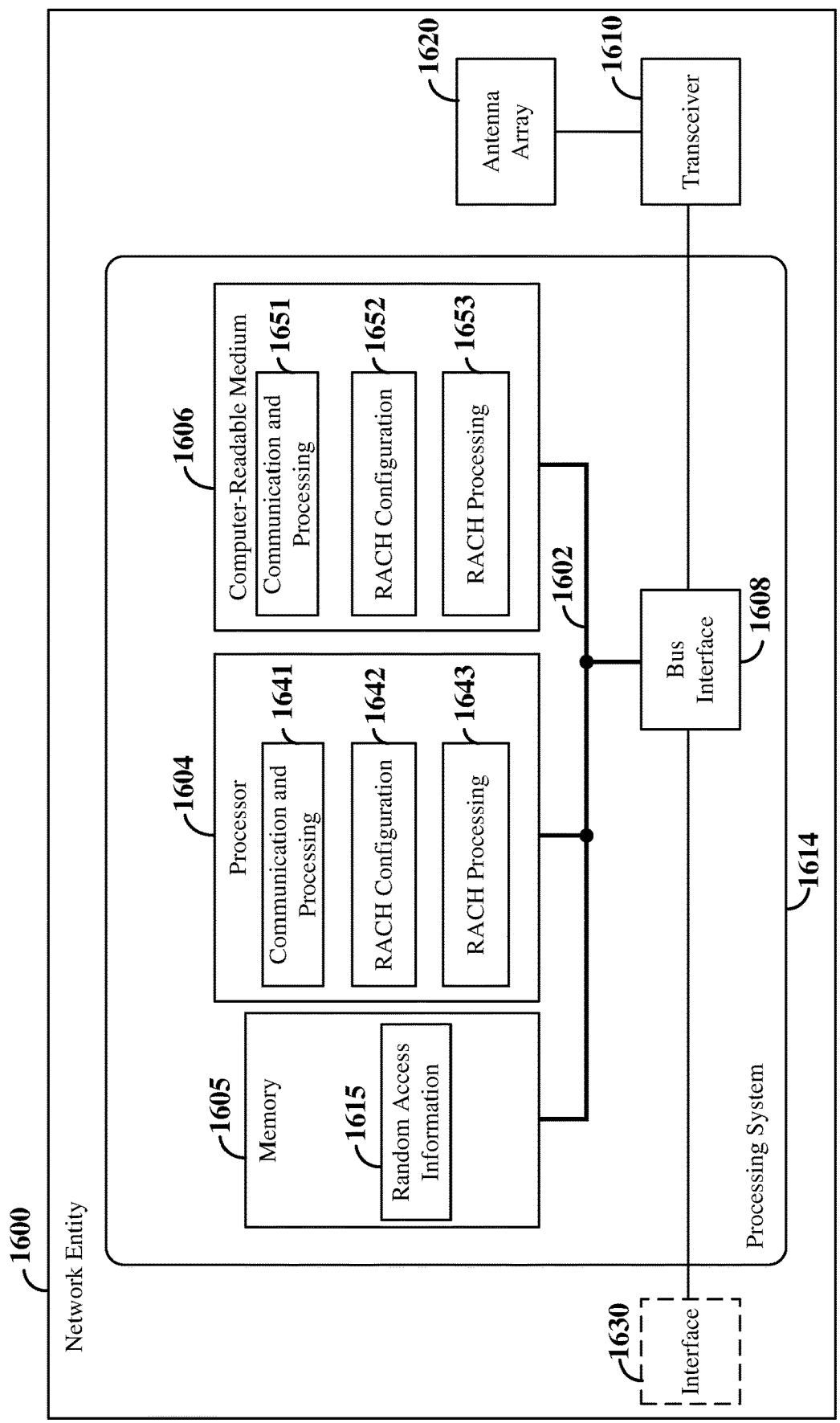
FIG. 16 is a block diagram conceptually illustrating an example of a hardware implementation for a network entity employing a processing system according to some aspects.

FIG. 16 is a conceptual diagram illustrating an example of a hardware implementation for a network entity 1600 employing a processing system 1614. In some implementations, the network entity 1600 may correspond to any of the network entities, base stations, CUs, DUs, RUs, or scheduling entities shown in any of FIGS. 1, 2, 3, 6, 12, and 13.

In accordance with various aspects of the disclosure, an element, or any portion of an element, or any combination of elements may be implemented with the processing system 1614. The processing system may include one or more processors 1604. The processing system 1614 may be substantially the same as the processing system 1414 illustrated in FIG. 14, including a bus interface 1608, a bus 1602, memory 1605, a processor 1604, a computer-readable medium 1606, a transceiver 1610, and an antenna array 1620. The memory 1605 may store random access information 1615 (e.g., RACH configuration information) used by the processor 1604 in cooperation with the transceiver 1610 for communication operations as described herein. Furthermore, the network entity 1600 may include an interface 1630 (e.g., a network interface) that provides a means for communicating with at least one other apparatus within a core network and with at least one radio access network.

The network entity 1600 may be configured to perform any one or more of the operations described herein (e.g., as described above in conjunction with FIGS. 1-13 and as described below in conjunction with FIG. 17). In some aspects of the disclosure, the processor 1604, as utilized in the network entity 1600, may include circuitry configured for various functions.

The processor 1604 may be configured to generate, schedule, and modify a resource assignment or grant of time-frequency resources (e.g., a set of one or more resource elements). For example, the processor 1604 may schedule time—frequency resources within a plurality of time division duplex (TDD) and/or frequency division duplex (FDD) subframes, slots, and/or mini-slots to carry user data traffic and/or control information to and/or from multiple scheduled entities. The processor 1604 may be configured to schedule resources for the transmission of downlink signals. The processor 1604 may further be configured to schedule resources for the transmission of uplink signals.

In some aspects of the disclosure, the processor 1604 may include communication and processing circuitry 1641. The communication and processing circuitry 1641 may be configured to communicate with a user equipment. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

The communication and processing circuitry 1641 may further be configured to receive an indication from the UE. For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 1641 may further be configured to receive a scheduling request from a UE for an uplink grant or a sidelink grant.

In some implementations wherein the communication involves receiving information, the communication and processing circuitry 1641 may obtain information from a component of the network entity 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

The processor 1604 may include RACH configuration circuitry 1642 configured to perform RACH configuration-related operations as discussed herein (e.g., one or more of the operations described above in conjunction with FIGS. 7-13). The RACH configuration circuitry 1642 may be configured to execute RACH configuration software 1652 included on the computer-readable medium 1606 to implement one or more functions described herein.

The RACH configuration circuitry 1642 may include functionality for a means for transmitting parameters (e.g., as described above in conjunction with FIGS. 7-13). For example, the RACH configuration circuitry 1642 may cooperate with the communication and processing circuitry 1641 to broadcast a SIB1 including RACH parameters.

The processor 1604 may include RACH processing circuitry 1643 configured to perform RACH processing-related operations as discussed herein (e.g., one or more of the operations described above in conjunction with FIGS. 7-13). The RACH processing circuitry 1643 may be configured to execute RACH processing software 1653 included on the computer-readable medium 1606 to implement one or more functions described herein.

The RACH processing circuitry 1643 may include functionality for a means for receiving a RACH message (e.g., as described above in conjunction with FIGS. 7-13). For example, the RACH processing circuitry 1643 may cooperate with the communication and processing circuitry 1641 to receive a RACH Msg1, a RACH Msg3, etc., from a UE on designated RACH resources (e.g., RACH occasions).

The RACH configuration circuitry 1642 may include functionality for a means for transmitting a RACH message (e.g., as described above in conjunction with FIGS. 7-13). For example, the RACH processing circuitry 1643 may cooperate with the communication and processing circuitry 1641 to transmit a RACH Msg2, a RACH Msg4, etc., to a network entity on designated RACH resources.

In some examples, the network entity 1600 shown and described above in connection with FIG. 16 may be a disaggregated base station. For example, the network entity 1600 shown in FIG. 16 may include the CU and optionally one or more DUs/RUs of the disaggregated base station. Other DUs/RUs associated with the network entity 1600 may be distributed throughout the network. In some examples, the DUs/RUs may correspond to TRPs associated with the network entity. In some examples, the CU and/or DU/RU of the disaggregated base station (e.g., within the network entity 1600) may generate random access parameters and provide the parameters to a user equipment, as well as receive and process RACH messages from the user equipment.

Figure 17:
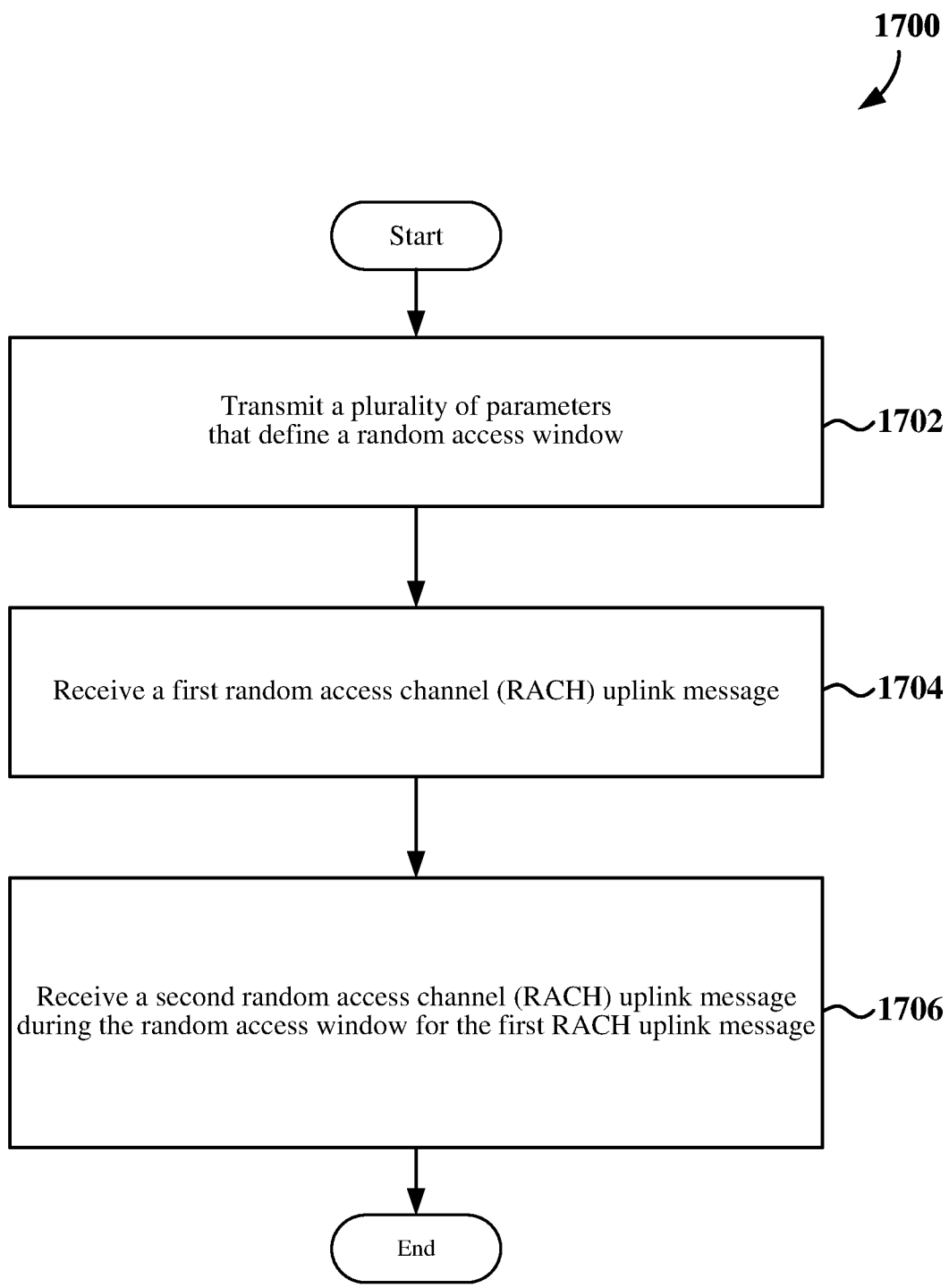
FIG. 17 is a flow chart illustrating an example wireless communication method involving RACH signaling according to some aspects.

FIG. 17 is a flow chart illustrating an example method 1700 for wireless communication in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the network entity 1600 illustrated in FIG. 16. In some examples, the method 1700 may be carried out by any suitable apparatus or means for carrying out the functions or algorithm described below.

At block 1702, a network entity may transmit a plurality of parameters that define the random access window. In some examples, the RACH configuration circuitry 1642 together with the communication and processing circuitry 1641 and the transceiver 1610, shown and described in FIG. 16, may provide a means to transmit a plurality of parameters that define the random access window.

At block 1704, the network entity may receive a first random access channel (RACH) uplink message. In some examples, the RACH processing circuitry 1643 together with the communication and processing circuitry 1641 and the transceiver 1610, shown and described in FIG. 16, may provide a means to receive a first random access channel (RACH) uplink message.

At block 1706, the network entity may receive a second RACH uplink message during the random access window for the first RACH uplink message. In some examples, the RACH processing circuitry 1643 together with the communication and processing circuitry 1641 and the transceiver 1610, shown and described in FIG. 16, may provide a means to receive a second RACH uplink message during the random access window for the first RACH uplink message.

In some examples, the network entity may transmit a RACH downlink message.

In some examples, the first RACH uplink message may include a physical random access channel (PRACH) preamble. In some examples, the random access window may include a random access response (RAR) window. In some examples, the RACH downlink message may include a RACH message 2.

In some examples, the first RACH uplink message may include a RACH message 3. In some examples, the random access window may include a contention resolution window. In some examples, the RACH downlink message may include a RACH message 4.

In some examples, the first RACH uplink message may include a physical random access channel (PRACH) preamble. In some examples, the second RACH uplink message may include a retransmission of the PRACH preamble.

In some examples, the first RACH uplink message may include a RACH message 3. In some examples, the second RACH uplink message may include a retransmission of a physical random access channel (PRACH) preamble.

In some examples, the network entity may transmit a plurality of parameters that define the random access window. In some examples, the plurality of parameters may include a random access window duration parameter. In some examples, the plurality of parameters may include a random access search space identifier that specifies slots and symbols for the user equipment to monitor during the random access window. In some examples, the plurality of parameters may include a time division duplex uplink downlink configuration that specifies a plurality of uplink slots and a plurality of downlink slots.

Referring again to FIG. 16, in one configuration, the network entity 1600 includes means for transmitting a plurality of parameters that define the random access window, means for receiving a first random access channel (RACH) uplink message, and means for receiving a second RACH uplink message during the random access window for the first RACH uplink message. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 3, 6, 12, 13, and 16, and utilizing, for example, the methods and/or algorithms described herein in relation to FIG. 17.

The methods shown in FIGS. 15 and 17 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: transmitting a first random access channel (RACH) uplink message for a first RACH attempt; determining that a RACH downlink message for the first RACH attempt has not been successfully decoded during a random access window and that there are no remaining downlink symbols available during the random access window to receive the RACH downlink message; and transmitting a second RACH uplink message for a second RACH attempt based on the determining that the RACH downlink message for the first RACH attempt has not been successfully decoded during the random access window and that there are no remaining downlink symbols available during the random access window to receive the RACH downlink message.

Aspect 2: The method of aspect 1, wherein the determining that the RACH downlink message has not been successfully decoded during the random access window comprises: determining that the RACH downlink message for the first RACH attempt has not been successfully decoded with a random access preamble identifier (RAPID) that is not addressed to the user equipment.

Aspect 3: The method of aspect 1 or 2, wherein the second RACH uplink message is transmitted during the random access window.

Aspect 4: The method of any of aspects 1 through 3, wherein: the method further comprises: monitoring for synchronization signal block signaling after determining that the RACH downlink message for the first RACH attempt has not been successfully decoded during the random access window and that there are no remaining downlink symbols available during the random access window to receive the RACH downlink message; and the transmitting the second RACH uplink message comprises transmitting the second RACH uplink message after the monitoring for the synchronization signal block signaling.

Aspect 5: The method of any of aspects 1 through 4, wherein the determining that the RACH downlink message for the first RACH attempt has not been successfully decoded during the random access window comprises: determining that downlink control information (DCI) scrambled with a random access radio network temporary identifier (RA-RNTI) has not been successfully decoded during the random access window.

Aspect 6: The method of any of aspects 1 through 4, wherein the determining that the RACH downlink message for the first RACH attempt has not been successfully decoded during the random access window comprises: determining that downlink control information (DCI) scrambled with a cell radio network temporary identifier (C-RNTI) has not been successfully decoded during the random access window.

Aspect 7: The method of any of aspects 1 through 6, wherein the determining that there are no remaining downlink symbols available during the random access window to receive the RACH downlink message comprises: determining whether there are any remaining slots within the random access window that are designated as downlink slots by a time division duplex uplink downlink configuration.

Aspect 8: The method of any of aspects 1 through 7, wherein the determining that there are no remaining downlink symbols available during the random access window to receive the RACH downlink message comprises: determining whether all remaining slots within the random access window are designated as uplink slots by a time division duplex uplink downlink configuration.

Aspect 9: The method of any of aspects 1 through 8, wherein the determining that there are no remaining downlink symbols available during the random access window to receive the RACH downlink message comprises: identifying a last physical downlink control channel occasion that is carrying a random access search space within the random access window.

Aspect 10: The method of any of aspects 1 through 9, wherein: the first RACH uplink message comprises a physical random access channel (PRACH) preamble; the random access window comprises a random access response (RAR) window; and the RACH downlink message comprises a RACH message 2.

Aspect 11: The method of any of aspects 1 through 9, wherein: the first RACH uplink message comprises a RACH message 3; the random access window comprises a contention resolution window; and the RACH downlink message comprises a RACH message 4.

Aspect 12: The method of any of aspects 1 through 9, wherein: the first RACH uplink message comprises a physical random access channel (PRACH) preamble; and the second RACH uplink message comprises a retransmission of the PRACH preamble.

Aspect 13: The method of any of aspects 1 through 9, wherein: the first RACH uplink message comprises a RACH message 3; and the second RACH uplink message comprises a retransmission of a physical random access channel (PRACH) preamble.

Aspect 14: The method of any of aspects 1 through 13, further comprising: receiving a plurality of parameters that define the random access window.

Aspect 15: The method of aspect 14, wherein the plurality of parameters comprise: a random access window duration parameter; a random access search space identifier that specifies slots and symbols for the user equipment to monitor during the random access window; and a time division duplex uplink downlink configuration that specifies a plurality of uplink slots and a plurality of downlink slots.

Aspect 16: A user equipment comprising: a transceiver configured to communicate with a radio access network, a memory, and a processor coupled to the transceiver and the memory, wherein the processor and the memory are configured to perform any one or more of aspects 1 through 15.

Aspect 17: An apparatus configured for wireless communication comprising at least one means for performing any one or more of aspects 1 through 15.

Aspect 18: A non-transitory computer-readable medium storing computer-executable code, comprising code for causing an apparatus to perform any one or more of aspects 1 through 15.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 6, 12, 13, 14, and 16 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
a transceiver; and
one or more processors configured to:
   transmit, via the transceiver, a first random access channel (RACH) uplink message for a first RACH attempt;
   determine that a RACH downlink message for the first RACH attempt has not been successfully decoded during a random access window and that there are no remaining downlink symbols available during the random access window to receive the RACH downlink message; and
   transmit, via the transceiver, a second RACH uplink message for a second RACH attempt based on the determination that the RACH downlink message for the first RACH attempt has not been successfully decoded during the random access window and that there are no remaining downlink symbols available during the random access window to receive the RACH downlink message.

2. The user equipment of claim 1, wherein, to determine that the RACH downlink message for the first RACH attempt has not been successfully decoded, the one or more processors are further configured to:
   determine that the RACH downlink message for the first RACH attempt has not been successfully decoded with a random access preamble identifier (RAPID) that is not addressed to the user equipment.

3. The user equipment of claim 1, wherein the second RACH uplink message is transmitted during the random access window.

4. The user equipment of claim 1, wherein the one or more processors are further configured to:
   monitor, via the transceiver, for synchronization signal block signaling after determining that the RACH downlink message for the first RACH attempt has not been successfully decoded during the random access window and that there are no remaining downlink symbols available during the random access window to receive the RACH downlink message; and transmit the second RACH uplink message after monitoring for the synchronization signal block signaling.

5. The user equipment of claim 1, wherein, to determine that the RACH downlink message for the first RACH attempt has not been successfully decoded during the random access window, the one or more processors are further configured to:
determine that downlink control information (DCI) scrambled with a random access radio network temporary identifier (RA-RNTI) has not been successfully decoded during the random access window.

6. The user equipment of claim 1, wherein, to determine that the RACH downlink message for the first RACH attempt has not been successfully decoded during the random access window, the one or more processors are further configured to:
determine that downlink control information (DCI) scrambled with a cell radio network temporary identifier (C-RNTI) has not been successfully decoded during the random access window.

7. The user equipment of claim 1, wherein, to determine that there are no remaining downlink symbols available during the random access window to receive the RACH downlink message, the one or more processors are further configured to:
determine whether there are any remaining slots within the random access window that are designated as downlink slots by a time division duplex uplink downlink configuration.

8. The user equipment of claim 1, wherein, to determine that there are no remaining downlink symbols available during the random access window to receive the RACH downlink message, the one or more processors are further configured to:
determine whether all remaining slots within the random access window are designated as uplink slots by a time division duplex uplink downlink configuration.

9. The user equipment of claim 1, wherein, to determine that there are no remaining downlink symbols available during the random access window to receive the RACH downlink message, the one or more processors are further configured to:
identify a last physical downlink control channel occasion that is carrying a random access search space within the random access window.

10. The user equipment of claim 1, wherein:
the first RACH uplink message comprises a physical random access channel (PRACH) preamble;
the random access window comprises a random access response (RAR) window; and
the RACH downlink message comprises a RACH message 2.

11. The user equipment of claim 1, wherein:
the first RACH uplink message comprises a RACH message 3;
the random access window comprises a contention resolution window; and
the RACH downlink message comprises a RACH message 4.

12. The user equipment of claim 1, wherein:
the first RACH uplink message comprises a physical random access channel (PRACH) preamble; and
the second RACH uplink message comprises a retransmission of the PRACH preamble.

13. The user equipment of claim 1, wherein:
the first RACH uplink message comprises a RACH message 3; and
the second RACH uplink message comprises a retransmission of a physical random access channel (PRACH) preamble.

14. The user equipment of claim 1, wherein the one or more processors are further configured to:
receive, via the transceiver, a plurality of parameters that define the random access window.

15. The user equipment of claim 14, wherein the plurality of parameters comprise:
a random access window duration parameter;
a random access search space identifier that specifies slots and symbols for the user equipment to monitor during the random access window; and
a time division duplex uplink downlink configuration that specifies a plurality of uplink slots and a plurality of downlink slots.

16. A method for wireless communication at a user equipment, the method comprising:
transmitting a first random access channel (RACH) uplink message for a first RACH attempt;
determining that a RACH downlink message for the first RACH attempt has not been successfully decoded during a random access window and that there are no remaining downlink symbols available during the random access window to receive the RACH downlink message; and
transmitting a second RACH uplink message for a second RACH attempt based on the determining that the RACH downlink message for the first RACH attempt has not been successfully decoded during the random access window and that there are no remaining downlink symbols available during the random access window to receive the RACH downlink message.

17. The method of claim 16, wherein the determining that the RACH downlink message has not been successfully decoded during the random access window comprises:
determining that the RACH downlink message for the first RACH attempt has not been successfully decoded with a random access preamble identifier (RAPID) that is not addressed to the user equipment.

18. The method of claim 16, wherein the second RACH uplink message is transmitted during the random access window.

19. The method of claim 16, wherein:
the method further comprises monitoring for synchronization signal block signaling after determining that the RACH downlink message for the first RACH attempt has not been successfully decoded during the random access window and that there are no remaining downlink symbols available during the random access window to receive the RACH downlink message; and
the transmitting the second RACH uplink message comprises transmitting the second RACH uplink message after the monitoring for the synchronization signal block signaling.

20. The method of claim 16, wherein the determining that the RACH downlink message for the first RACH attempt has not been successfully decoded during the random access window comprises:
determining that downlink control information (DCI) scrambled with a random access radio network temporary identifier (RA-RNTI) has not been successfully decoded during the random access window.

21. The method of claim 16, wherein the determining that the RACH downlink message for the first RACH attempt has not been successfully decoded during the random access window comprises:

determining that downlink control information (DCI) scrambled with a cell radio network temporary identifier (C-RNTI) has not been successfully decoded during the random access window.

22. The method of claim 16, wherein the determining that there are no remaining downlink symbols available during the random access window to receive the RACH downlink message comprises:
   determining whether there are any remaining slots within the random access window that are designated as downlink slots by a time division duplex uplink downlink configuration.

23. The method of claim 16, wherein the determining that there are no remaining downlink symbols available during the random access window to receive the RACH downlink message comprises:
   determining whether all remaining slots within the random access window are designated as uplink slots by a time division duplex uplink downlink configuration.

24. The method of claim 16, wherein the determining that there are no remaining downlink symbols available during the random access window to receive the RACH downlink message comprises:
   identifying a last physical downlink control channel occasion that is carrying a random access search space within the random access window.

25. The method of claim 16, wherein:
   the first RACH uplink message comprises a physical random access channel (PRACH) preamble;
   the random access window comprises a random access response (RAR) window; and
   the RACH downlink message comprises a RACH message 2.

26. The method of claim 16, wherein:
   the first RACH uplink message comprises a RACH message 3;
   the random access window comprises a contention resolution window; and
   the RACH downlink message comprises a RACH message 4.

27. The method of claim 16, wherein:
   the first RACH uplink message comprises a physical random access channel (PRACH) preamble; and
   the second RACH uplink message comprises a retransmission of the PRACH preamble.

28. The method of claim 16, wherein:
   the first RACH uplink message comprises a RACH message 3; and
   the second RACH uplink message comprises a retransmission of a physical random access channel (PRACH) preamble.

29. The method of claim 16, further comprising:
   receiving a plurality of parameters that define the random access window.

30. A user equipment, comprising:
   means for transmitting a first random access channel (RACH) uplink message for a first RACH attempt;
   means for determining that a RACH downlink message for the first RACH attempt has not been successfully decoded during a random access window and that there are no remaining downlink symbols available during the random access window to receive the RACH downlink message; and
   means for transmitting a second RACH uplink message for a second RACH attempt based on the determining that the RACH downlink message for the first RACH attempt has not been successfully decoded during the random access window and that there are no remaining downlink symbols available during the random access window to receive the RACH downlink message.

* * * * *